United States Patent [19]

Soma et al.

[11] 4,413,076

[45] Nov. 1, 1983

[54] POLYALKYLPIPERDINE SIDE CHAIN STABILIZERS FOR SYNTHETIC POLYMER COMPOSITIONS

[75] Inventors: Nobuo Soma; Syoji Morimura; Takao Yoshioka; Tomoyuki Kurumada, all of Hiromachi, Japan

[73] Assignee: Sankyo Company Ltd., Tokyo, Japan

[21] Appl. No.: 412,806

[22] Filed: Aug. 30, 1982

Related U.S. Application Data

[63] Continuation of Ser. No. 183,153, Sep. 2, 1980, abandoned, which is a continuation of Ser. No. 957,100, Nov. 3, 1978, abandoned.

[30] Foreign Application Priority Data

Nov. 8, 1977 [JP] Japan ............................. 52-133776

[51] Int. Cl.³ ............................................. C08K 5/16
[52] U.S. Cl. .................................. 524/102; 524/103; 525/440; 546/20
[58] Field of Search .................. 524/102, 103; 546/20; 525/440

[56] References Cited

U.S. PATENT DOCUMENTS 3,840,494 10/1974 Murayama et al. ................ 524/102
4,005,094 1/1977 Murayama et al. ................ 524/102
4,066,615 1/1978 Murayama et al. ................ 524/103

Primary Examiner—Donald E. Czaja
Assistant Examiner—W. Thompson
Attorney, Agent, or Firm—Toren, McGeady and Stanger

[57] ABSTRACT

Polymers containing polyalkylpiperidines, preparation and use thereof as stabilizers for synthetic polymer compositions are described. In said polymer, sterically hindered polyalkylpiperidines are laterally linked to the main chain. The polymers are distinguished by an improved stabilizing effect in various synthetic polymer compositions, such as polyolefins, against light- and/or heat-induced deterioration thereof. The polyalkylpiperidine-containing polymers of the invention are hardly volatile upon heat-processing or during storage of shaped articles containing said polymers, and are resistant to extraction with solvents.

7 Claims, No Drawings

POLYALKYLPIPERDINE SIDE CHAIN STABILIZERS FOR SYNTHETIC POLYMER COMPOSITIONS

This is a continuation of application Ser. No. 183,153, filed Sept. 2, 1980, now abandoned, which, in turn, is a continuation of application Ser. No. 957,100, filed Nov. 3, 1978, now abandoned.

The invention relates to polymers substituted with polyalkylpiperidine side chains, preparation and use thereof as stabilizers. The polymers of the invention having sterically hindered polyalkylpiperidine side chains are novel compounds.

It has been known that polyalkylpiperidine derivatives in which 1- and/or 4-positions are substituted are effective polymer stabilizers against light- and heat-degradation thereof. For example, 4-spirohydantoins of 2,2,6,6-tetramethylpiperidine or 2,6-diethyl-2,3,6,-trimethylpiperidine are disclosed in U.S. Pat. Nos. 3,542,729; 3,941,744; 3,975,462 and 3,898,303 and British Patent Specification No. 1,481,300; 4-amino derivatives are disclosed in U.S. Pat. Nos. 3,684,765 and 3,904,581 and British Patent Specification No. 1,492,494; esters, ethers and carbamates of 4-ol are disclosed in U.S. Pat. Nos. 3,640,928; 3,840,494; 4,021,432; 3,940,363; 3,993,655 and 4,075,165 and German Offenlegungsschrift 2,647,452; ketal derivatives of 4-oxo compounds are disclosed in U.S. Pat. Nos. 3,899,464 and 3,940,363 and British Patent Specification No. 1,478,261.

The above-mentioned stabilizer compounds, however, possess some drawbacks. For example, some of them are relatively volatile compounds in spite of a good light stabilizing effect and are not used in practice for the stabilization of synthetic polymeric materials since they volatilize at the processing temperatures and also during prolonged outdoor storage of the stabilized articles. Some others are relatively easily extracted from synthetic polymeric materials with water or organic solvents and are not fit for practical use for the stabilization of synthetic polymeric materials. The inventors have found that compounds disclosed below exhibit superior stabilizing activity of synthetic polymeric materials against photo- and thermal-deterioration thereof and have surprisingly less thermovolatility and extractability from polymeric materials and therefore are advantageously useful as stabilizers which have overcome the above-mentioned drawbacks of known stabilizers.

Polymers of the invention substituted with polyalkylpiperidine side chains have the structural unit represented by the following formula:

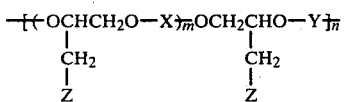
(I)

wherein:
n is an integer of from 2 to 50,
m is 0 or 1, and,
when m is 0;
Y is an aliphatic, aromatic araliphatic or alicyclic diacyl group having up to 20 carbon atoms,
when m is 1;
if Z is any one of the following formulas in which A of formula (II) represents —O—CH<,

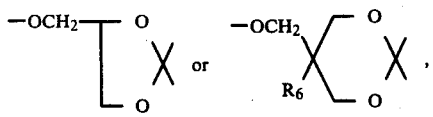

X represents a saturated aliphatic diacyl group having up to 20 carbon atoms, benzenedicarbonyl group, cyclohexanedicarbonyl group, a group of formula

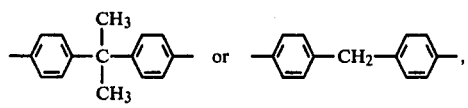

and
if Z is any one of the following formulas in which A of formula (II) represents

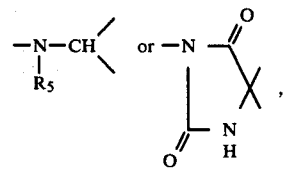

or
if Z is a group of following formula (III),
X represents a saturated aliphatic diacyl group having up to 20 carbon atoms, benzenedicarbonyl group, cyclohexanedicarbonyl group, a group of formula

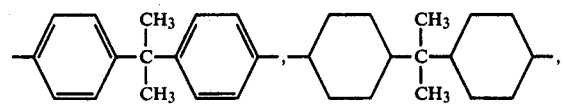

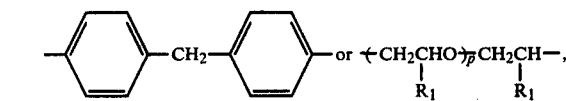

in which,
P is 0 or an integer of from 1 to 8, and,
$R_1$ is hydrogen atom or methyl group,
Y represents a saturated aliphatic diacyl group having up to 20 carbon atoms, benzenedicarbonyl group, cyclohexanedicarbonyl group, an alkylene group having from 3 to 10 carbon atoms, xylylene group, a group of formula

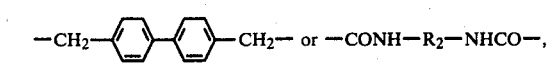

in which,
$R_2$ is an alkylene group having from 2 to 10 carbon atoms or a phenylene group optionally substituted with methyl,
Z represents a group of formula

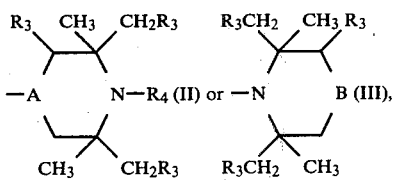

in which,
R$_3$ is hydrogen atom or methyl group,
R$_4$ is hydrogen atom or methyl group,
A is a group of formula

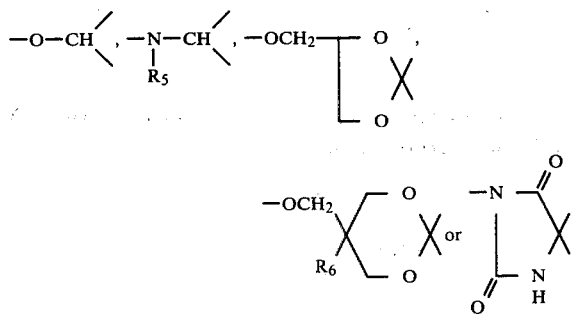

B is a group of formula

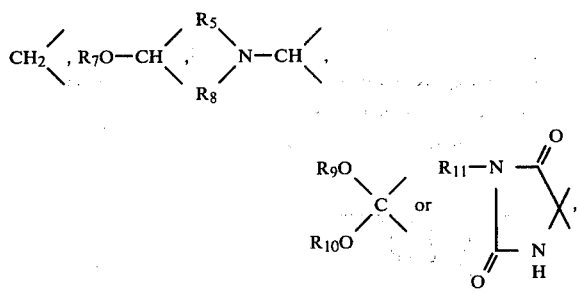

in which,
R$_5$ is an alkyl group having from 1 to 18 carbon atoms, cyclohexyl group, a phenyl group optionally substituted with C$_{1-4}$alkyl or alkoxy, or benzyl group,
R$_6$ is methyl group or ethyl group,
R$_7$ is an aliphatic, aromatic, araliphatic or alicyclic acyl group having up to 18 carbon atoms, an alkyl group having from 1 to 18 carbon atoms, allyl group, benzyl group or a group of formula —CONHR$_{12}$ (R$_{12}$ is an alkyl group having from 1 to 18 carbon atoms, phenyl group, naphthyl group or cyclohexyl group),
R$_8$ is an aliphatic, aromatic, araliphatic or alicyclic acyl group having up to 18 carbon atoms, an alkyl group having from 1 to 18 carbon atoms or benzyl group,
R$_9$ and R$_{10}$ are same or different and each is an alkyl group having from 1 to 4 carbon atoms, or
R$_9$ and R$_{10}$ jointly represent a group of formula

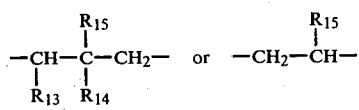

[R$_{13}$ and R$_{14}$ are same or different and each is hydrogen atom or an alkyl group having from 1 to 3 carbon atoms; R$_{15}$ is hydrogen atom, an alkyl group having from 1 to 3 carbon atoms or a group of formula —CH$_2$OR$_{16}$ (R$_{16}$ is an aliphatic, aromatic, araliphatic or alicyclic acyl group having up to 18 carbon atoms)].

R$_{11}$ is an alkyl group having from 1 to 18 carbon atoms, allyl group, benzyl group or a group of formula

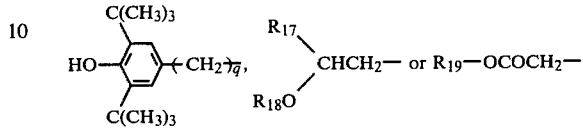

q is an integer of 1,2 or 3, R$_{17}$ is hydrogen atom, methyl group or phenyl group, R$_{18}$ is an aliphatic, aromatic, araliphatic or alicyclic acyl group having up to 18 carbon atoms, R$_{19}$ is an alkyl group having from 1 to 18 carbon atoms).

In formula (I),
n is preferably an integer of from 2 to 10, most preferably 2 to 6.
m is preferably 0.
when m is 0;
When Y is an aliphatic, aromatic, araliphatic or alicyclic diacyl group having up to 20 carbon atoms, it may be, e.g. a saturated aliphatic diacyl group such as malonyl, succinyl, glutaryl, adipoyl, suberoyl, 1,1-diethylmalonyl, sabacoyl, decane-1,10-dicarbonyl, dodecane-1,12-dicarbonyl, tetradecane-1,14-dicarbonyl, hexadecane-1,16-dicarbonyl, octadecane-1,18-dicarbonyl, diglycolloyl or thiodiglycolloyl; an aromatic diacyl group such as phthaloyl, isophthaloyl or terephthaloyl; an araliphatic diacyl group such as p-xylylenedicarbonyl group; or, an alicyclic diacyl group such as cyclohexane-1,2-( or -1,3- or -1,4-)dicarbonyl, 4-cyclohexene-1,2-dicarbonyl, 3-(or 4-)methyl-4-cyclohexene-1,2-dicarbonyl or 5-norbornene-2,3-dicarbonyl; preferably a saturated aliphatic diacyl group having from 4 to 12 carbon atoms, benzenedicarbonyl group, cyclohexanedicarbonyl group, 4-cyclohexene-1,2-dicarbonyl group, 3-(or 4-)-methyl-4-cyclohexene-1,2-dicarbonyl group or 5-norbornene-2,3-dicarbonyl, most preferably succinyl group, phthaloyl group, cyclohexane-1,2-dicarbonyl group or 4-cyclohexene-1,2-dicarbonyl group, particularly phthaloyl group.
when m is 1;
When X and Y are saturated aliphatic diacyl groups having up to 20 carbon atoms, they may be, e.g., malonyl, succinyl, glutaryl, adipoyl, suberoyl, 1,1-diethylmalonyl, sebacoyl, decane-1,10-dicarbonyl, docecane-1,12-dicarbonyl, tetradecane-1,14-dicarbonyl, hexadecane-1,16-dicarbonyl or octadecane-1,18-dicarbonyl, preferably saturated aliphatic diacyl groups having from 4 to 12 carbon atoms.
When X and Y are benzenedicarbonyl groups or cyclohexanedicarbonyl group, they may be phthaloyl, isophthaloyl, terephthaloyl or cyclohexane-1,2-(or -1,3- or 1,4-)dicarbonyl.
When X is a group of formula

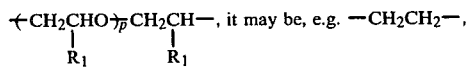

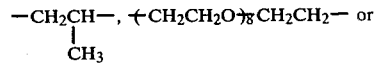

-continued

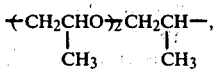

preferably ethylene group.

When Y is an alkylene group having from 3 to 10 carbon atoms, it may be a straight chain alkylene group, e.g. trimethylene, tetramethylene, hexamethylene, octamethylene or decamethylene or a branched chain alkylene group, preferably a straight chain alkylene group having from 4 to 6 carbon atoms.

When Y is a xylylene group, it may be 1,2-, 1,3- or 1,4-xylylene, preferably 1,4-xylylene.

When Y is a group of formula —CONH—$R_2$—NHCO—;

When $R_2$ is an alkylene group having from 2 to 10 carbon atoms, it may be a straight chain alkylene group, e.g. ethylene, propylene, trimethylene, tetramethylene, hexamethylene, octamethylene or decamethylene or a branched chain alkylene group, preferably hexamethylene.

When $R_2$ is a phenylene group optionally substituted with methyl, it may be, e.g. 1,2-, 1,3- or 1,4-phenylene or 4-methyl-1,3-phenylene.

When Z is a group in which A of formula (II) is

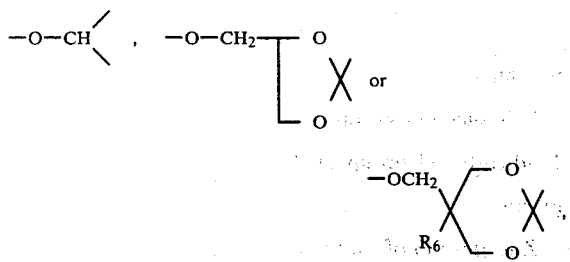

preferred X are a saturated aliphatic diacyl group having from 4 to 12 carbon atoms or a group of formula

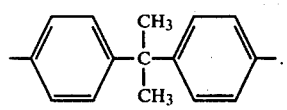

When Z is a group in which A of formula (II) is

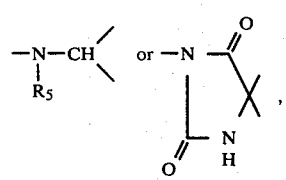

or when Z is a group of formula (III), preferred X are a saturated aliphatic diacyl group having from 4 to 12 carbon atoms, a group of formula

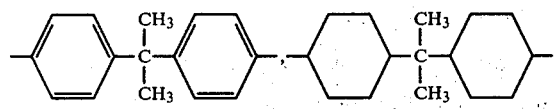

or ethylene group.

When m is 1, Y is preferably a saturated aliphatic diacyl group having from 4 to 12 carbon atoms.

When Z is a group of formula (II) or (III), $R_3$ is preferably hydrogen atom.

$R_4$ is preferably hydrogen atom or methyl group.

When $R_5$, $R_7$, $R_8$, $R_{12}$ and $R_{19}$ are alkyl groups having from 1 to 18 carbon atoms, they may be straight chain alkyl groups, e.g. methyl, ethyl, n-propyl, n-butyl, octyl, dodecyl or octadecyl or branched chain alkyl groups, preferably, straight chain alkyl groups having from 1 to 8 carbon atoms, most preferably straight chain alkyl groups having from 1 to 4 carbon atoms.

When $R_5$ is a phenyl group optionally substituted with $C_{1-4}$alkyl or alkoxy, it may be, e.g. phenyl, o-, m- or p-tolyl, o-, m- or p-methoxyphenyl or p-n-butoxyphenyl, preferably phenyl.

$R_6$ is preferably ethyl group.

When $R_7$, $R_8$, $R_{16}$ and $R_{18}$ is an aliphatic, aromatic, araliphatic or alicyclic acyl group having up to 18 carbon atoms, they may be, e.g. saturated or unsaturated aliphatic acyl groups having from 2 to 18 carbon atoms such as acetyl, propionyl, valeryl, octanoyl, 2-ethylhexanoyl, lauroyl, palmitoyl, stearoyl, acryloyl, crotonoyl or methacryloyl; aromatic acyl groups such as benzoyl, o-, m- or p-toluoyl, p-tert-butylbenzoyl, salicyloyl or 3,5-di-tert-butyl-4-hydroxybenzoyl; araliphatic acyl groups such as phenylacetyl, 3-(3-methyl-5-tert-butyl-4-hydroxyphenyl)propionyl or 3-(3,5-di-tert-butyl-4-hydroxyphenyl)propionyl; or alicyclic acyl groups such as cyclohexanecarbonyl; preferably alkanoyl groups having from 2 to 18 carbon atoms, benzoyl group or 3-(3,5-di-tert-butyl-4-hydroxyphenyl)propionyl; most preferably alkanoyl groups having from 2 to 12 carbon atoms or benzoyl, particularly acetyl.

When $R_9$ and $R_{10}$ are same or different and each represents an alkyl group having from 1 to 4 carbon atoms, it may be, e.g. methyl, ethyl, n-propyl or n-butyl.

When $R_9$ and $R_{10}$ jointly represent a group of formula

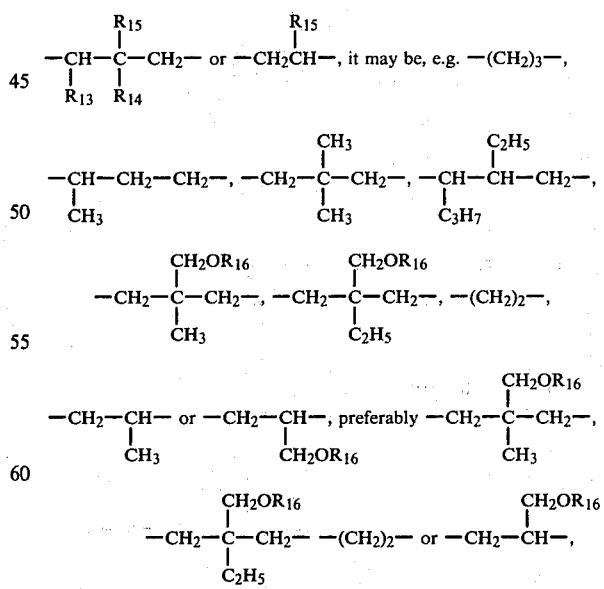

most preferably —$(CH_2)_2$—.

When $R_{11}$ is an alkyl group having from 1 to 18 carbon atoms, it may be the same groups as illustrated in the above-defined $R_5$ when it is an alkyl group having from 1 to 18 carbon atoms, preferably an alkyl group having from 1 to 12 carbon atoms, most preferably an alkyl group having from 4 to 12 carbon atoms.

When $R_{11}$ is a group of formula

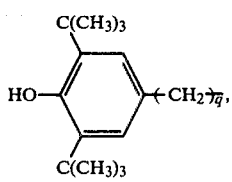

it may be 3,5-di-tert-butyl-4-hydroxybenzyl, 3,5-di-tert-butyl-4-hydroxyphenethyl or 3-(3,5-di-tert-butyl-4-hydroxyphenyl)propyl.

When $R_{11}$ is a group of formula

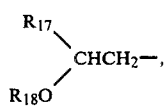

$R_{17}$ is preferably hydrogen atom.

Preferred groups for Z are, in formulas (II) and (III), when:

$R_3$ is hydrogen atom, $R_4$ is hydrogen atom or methyl group,

A is a group of formula

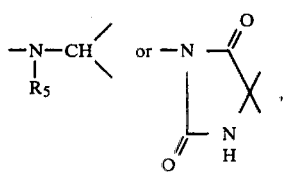

B is a group of formula

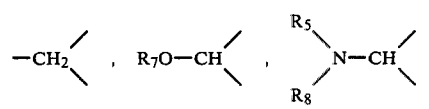

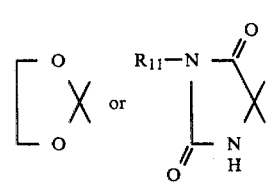

in which, $R_5$ is an alkyl group having from 1 to 8 carbon atoms, $R_7$ is an alkanoyl group having from 2 to 12 carbon atoms, benzoyl group or benzyl group, $R_8$ is an alkanoyl group having from 2 to 12 carbon atoms or benzoyl group, and $R_{11}$ is an alkyl group having from 1 to 12 carbon atoms or a group of formula $-CH_2CH_2OR_{18}$ ($R_{18}$ is an alkanoyl group having from 2 to 12 carbon atoms, benzoyl group or 3-(3,5-di-tert-butyl-4-hydroxyphenyl)propionyl), preferably an alkyl group having from 1 to 12 atoms.

According to the invention, polymers having the following structural unit may preferably be employed:

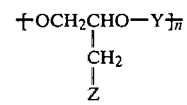

in which,

Y is succinyl group, phthaloyl group, cyclohexane-1,2-dicarbonyl group or 4-cyclohexene-1,2-dicarbonyl group, Z is a group of formula

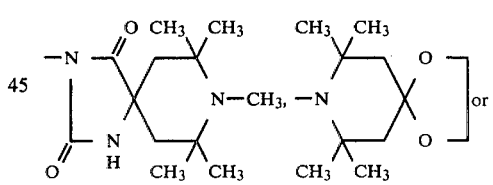

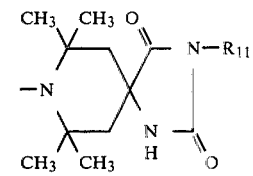

in which, $R_{11}$ is an alkyl group having from 1 to 12 carbon atoms, and n is an integer of from 2 to 6.

The following is a non-limiting list of recurring units of polymers of the invention.

| No. | m | X | Y | $R_3$ | $R_4$ | A |
|---|---|---|---|---|---|---|
| I-1 | 0 | — | phthaloyl (benzene-1,2-dicarbonyl) | H | $CH_3$ | >CHO— |
| 2 | 0 | — | " | H | H | " |
| 3 | 0 | — | " | $CH_3$ | H | " |
| 4 | 0 | — | cyclohexane-1,2-dicarbonyl | H | $CH_3$ | " |
| 5 | 0 | — | cyclohexene-1,2-dicarbonyl | H | $CH_3$ | " |
| 6 | 0 | — | $-CO(CH_2)_2CO-$ | H | $CH_3$ | " |
| 7 | 0 | — | $-CO(CH_2)_4CO-$ | H | $CH_3$ | " |
| 8 | 1 | $-CO(CH_2)_4CO-$ | " | H | $CH_3$ | " |
| 9 | 1 | " | " | H | H | " |
| 10 | 1 | $-C_6H_4-C(CH_3)_2-C_6H_4-$ | " | H | $CH_3$ | " |
| 11 | 0 | — | phthaloyl | H | $CH_3$ | dioxolane-CH$_2$O— |
| 12 | 0 | — | " | H | H | " |
| 13 | 0 | — | " | H | $CH_3$ | dioxolane (CH$_3$)(CH$_2$O—) |
| 14 | 0 | — | " | H | $CH_3$ | dioxolane (C$_2$H$_5$)(CH$_2$O—) |
| 15 | 0 | — | cyclohexane-1,2-dicarbonyl | H | $CH_3$ | " |
| 16 | 0 | — | cyclohexene-1,2-dicarbonyl | H | $CH_3$ | dioxolane-CH$_2$O— |
| 17 | 0 | — | methylcyclohexene-1,2-dicarbonyl | H | $CH_3$ | " |

-continued
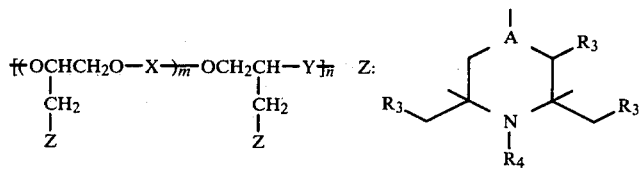
| No. | m | X | Y | R₃ | R₄ | A |
|---|---|---|---|---|---|---|
| 18 | 0 | — | —CO(CH₂)₂CO— | H | CH₃ | " |
| I-19 | 1 | —CO(CH₂)₄CO— | —CO(CH₂)₄CO— | H | CH₃ | " |
| 20 | 1 | -C(CH₃)₂- bridged diphenyl | " | H | CH₃ | " |
| 21 | 1 | " | " | H | H | " |
| 22 | 0 | — | phthaloyl (benzene-1,2-dicarbonyl) | H | CH₃ | >CH—N(CH₃)₂ |
| 23 | 0 | — | " | H | CH₃ | >CH—N(CH₃)(C₂H₅) |
| 24 | 0 | — | " | H | CH₃ | >CH—N(CH₃)(C₄H₉) |
| 25 | 0 | — | " | H | H | " |
| 26 | 0 | — | " | H | CH₃ | >CH—N(CH₃)(C₈H₁₇) |
| 27 | 0 | — | " | H | CH₃ | >CH—N(CH₃)(C₁₂H₂₅) |
| 28 | 0 | — | " | H | CH₃ | >CH—N(CH₃)(C₆H₅) |
| 29 | 0 | — | " | H | CH₃ | >CH—N(CH₃)(cyclohexyl) |
| 30 | 0 | — | " | H | CH₃ | >CH—N(CH₃)(CH₂C₆H₅) |
| 31 | 0 | — | cyclohexane-1,2-dicarbonyl | H | CH₃ | >CH—N(CH₃)(C₄H₉) |
| 32 | 0 | — | " | H | H | " |

-continued $$\text{-(OCHCH}_2\text{O-X)}_{\overline{m}}\text{OCH}_2\text{CH-Y}_{\overline{n}} \quad Z:$$
$$\begin{array}{c}|\\\text{CH}_2\\|\\Z\end{array} \qquad \begin{array}{c}|\\\text{CH}_2\\|\\Z\end{array}$$

Z structure: piperidine-type ring with A at top, R₃ groups on ring carbons, and N-R₄

| No. | m | X | Y | R₃ | R₄ | A |
|---|---|---|---|---|---|---|
| 33 | 0 | — | cyclohexene-1,2-dicarbonyl (–CO–...–CO–) | H | CH₃ | " |
| 34 | 0 | — | " | H | H | " |
| 35 | 0 | — | " | H | CH₃ | CH–N(CH₃)(C₈H₁₇) |
| 36 | 0 | — | methyl-cyclohexene-dicarbonyl | H | CH₃ | CH–N(CH₃)(C₄H₉) |
| I-37 | 0 | — | " | H | CH₃ | CH–N(CH₃)(C₈H₁₇) |
| 38 | 0 | — | norbornene-2,3-dicarbonyl | H | CH₃ | CH–N(CH₃)(C₄H₉) |
| 39 | 0 | — | –CO(CH₂)₂CO– | H | CH₃ | " |
| 40 | 0 | — | " | H | CH₃ | CH–N(CH₃)(C₈H₁₇) |
| 41 | 1 | –CO(CH₂)₄CO– | –CO(CH₂)₄CO– | H | CH₃ | CH–N(CH₃)(C₄H₉) |
| 42 | 1 | –CO(CH₂)₈CO– | –CO(CH₂)₈CO– | H | H | " |
| 43 | 1 | –CO–C₆H₄–CO– (para) | –CO–C₆H₄–CO– (para) | H | CH₃ | " |
| 44 | 1 | –C₆H₄–C(CH₃)₂–C₆H₄– | –CO(CH₂)₄CO– | H | CH₃ | " |
| 45 | 1 | " | –CONH–C₆H₃(CH₃)–NHCO– | H | CH₃ | " |
| 46 | 1 | " | –CONH(CH₂)₆NHCO– | H | CH₃ | " |

-continued

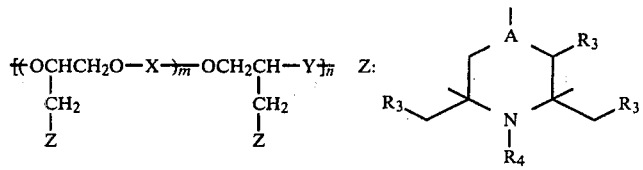

| No. | m | X | Y | R₃ | R₄ | A |
|---|---|---|---|---|---|---|
| 47 | 1 | [bis-cyclohexyl-C(CH₃)₂] | —CO(CH₂)₄CO— | H | H | " |
| 48 | 1 | [bis-phenyl-CH₂] | " | H | H | " |
| 49 | 1 | —CH₂CH₂— | " | H | H | " |
| 50 | 0 | — | [phthaloyl] | H | CH₃ | [structure with N, NH, C=O] |
| 51 | 0 | — | " | H | H | " |
| 52 | 0 | — | " | CH₃ | CH₃ | " |
| I-53 | 0 | — | [cyclohexane-1,2-dicarbonyl] | H | CH₃ | " |
| 54 | 0 | — | " | H | H | " |
| 55 | 0 | — | [cyclohexene-1,2-dicarbonyl] | H | CH₃ | " |
| 56 | 0 | — | " | H | H | " |
| 57 | 0 | — | [4-methylcyclohexene-1,2-dicarbonyl] | H | CH₃ | " |
| 58 | 0 | — | [norbornene-2,3-dicarbonyl] | H | CH₃ | " |
| 59 | 0 | — | —CO(CH₂)₂CO— | H | CH₃ | " |
| 60 | 0 | — | —CO(CH₂)₃CO— | H | CH₃ | " |
| 61 | 0 | — | —CO(CH₂)₈CO— | H | CH₃ | " |
| 62 | 0 | — | —COCH₂OCH₂CO— | H | CH₃ | " |
| 63 | 1 | —CO(CH₂)₂CO— | —CO(CH₂)₂CO— | H | CH₃ | " |
| 64 | 1 | —CO(CH₂)₄CO— | —CO(CH₂)₄CO— | H | CH₃ | " |
| 65 | 1 | [cyclohexane-1,2-dicarbonyl] | [cyclohexane-1,2-dicarbonyl] | H | CH₃ | " |

-continued $+(OCHCH_2O-X)_m-OCH_2CH-Y+_n$ with $CH_2$/$Z$ branches

Z: piperidine-like ring with A bridge, R$_3$ substituents, N-R$_4$

| No. | m | X | Y | R$_3$ | R$_4$ | A |
|---|---|---|---|---|---|---|
| 66 | 1 | -C$_6$H$_4$-C(CH$_3$)$_2$-C$_6$H$_4$- | -CO(CH$_2$)$_4$CO- | H | CH$_3$ | " |
| 67 | 1 | " | -CO(CH$_2$)$_8$CO- | H | H | " |
| 68 | 1 | " | -CO-(cyclohexyl-1,4)-CO- | H | H | " |
| 69 | 1 | " | -(CH$_2$)$_6$- | H | CH$_3$ | " |
| I-70 | 1 | " | -CH$_2$-C$_6$H$_4$-CH$_2$- | H | CH$_3$ | " |
| 71 | 1 | " | -CH$_2$-C$_6$H$_4$-C$_6$H$_4$-CH$_2$- | H | CH$_3$ | " |
| 72 | 1 | -C$_6$H$_{10}$-C(CH$_3$)$_2$-C$_6$H$_{10}$- | -CO(CH$_2$)$_4$CO- | H | CH$_3$ | " |
| 73 | 1 | -C$_6$H$_4$-CH$_2$-C$_6$H$_4$- | " | H | CH$_3$ | " |
| 74 | 1 | -CH$_2$CH$_2$- | " | H | CH$_3$ | " |
| 75 | 1 | " | " | H | H | " |

$+(OCHCH_2O-X)_m-OCH_2CHO-Y+_n$ with $CH_2$/$Z$ branches

Z: 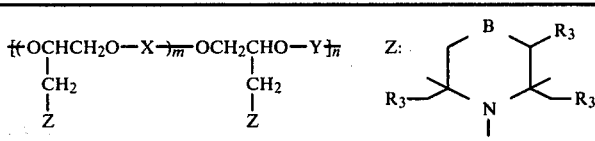

| No. | m | X | Y | R$_3$ | B |
|---|---|---|---|---|---|
| II-1 | 0 | — | phthaloyl (-CO-C$_6$H$_4$-CO-, ortho) | H | -CH$_2$- |
| 2 | 0 | — | cyclohexane-1,2-dicarbonyl (-CO-C$_6$H$_{10}$-CO-) | H | " |

-continued
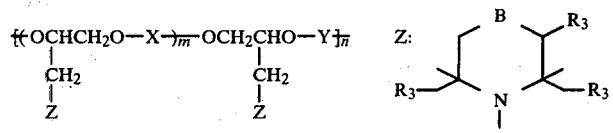
| No. | m | X | Y | $R_3$ | B |
|---|---|---|---|---|---|
| 3 | 0 | — | cyclohexene-1,2-dicarbonyl (—CO— / —CO—) | H | " |
| 4 | 0 | — | norbornene-2,3-dicarbonyl (—CO— / —CO—) | H | " |
| 5 | 0 | — | $-CO(CH_2)_2CO-$ | H | " |
| 6 | 1 | $-CO(CH_2)_4CO-$ | " | H | " |
| 7 | 1 | $-C_6H_4-C(CH_3)_2-C_6H_4-$ | " | H | " |
| 8 | 0 | — | phthaloyl (o-$C_6H_4$(CO—)$_2$) | H | $>CH-OCH_3$ |
| 9 | 0 | — | " | H | $>CH-OC_4H_9$ |
| 10 | 0 | — | " | H | $>CH-OC_8H_{17}$ |
| 11 | 0 | — | " | H | $>CH-OCH_2CH=CH_2$ |
| 12 | 0 | — | " | H | $>CH-OCH_2C_6H_5$ |
| 13 | 0 | — | " | H | $>CH-OCOCH_3$ |
| 14 | 0 | — | " | H | $>CH-OCOCH(C_2H_5)(C_4H_9)$ |
| 15 | 0 | — | " | H | $>CH-OCOC_{11}H_{23}$ |
| 16 | 0 | — | " | H | $>CH-OCOC_{17}H_{35}$ |

-continued
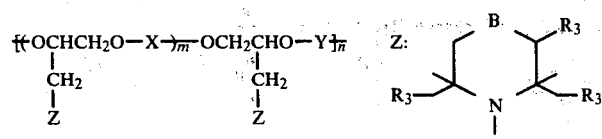
| No. | m | X | Y | R₃ | B |
|---|---|---|---|---|---|
| 17 | 0 | — | " | H | >CH—OCOCH=CH₂ |
| II-18 | 0 | — | " | H | >CH—OCO—C₆H₅ |
| 19 | 0 | — | " | H | >CH—OCO—C₆H₄—C(CH₃)₃ |
| 20 | 0 | — | " | H | >CH—OCO—C₆H₁₁ |
| 21 | 0 | — | " | H | >CH—OCOCH₂—C₆H₅ |
| 22 | 0 | — | " | H | >CH—OCOCH₂CH₂—C₆H₂(X)₂—OH |
| 23 | 0 | — | " | H | >CH—OCONHC₂H₅ |
| 24 | 0 | — | " | H | >CH—OCONH—C₆H₅ |
| 25 | 0 | — | " | H | >CH—OCONH—C₁₀H₇ |
| 26 | 0 | — | " | H | >CH—OCONH—C₆H₁₁ |
| 27 | 0 | — | cyclohexane-1,2-(CO—)₂ | H | >CH—OCH₂—C₆H₅ |

-continued $$\{(OCHCH_2O-X)_{\overline{m}}-OCH_2CHO-Y\}_{\overline{n}}$$
         |                      |
         CH$_2$                 CH$_2$
         |                      |
         Z                      Z Z:
$$\begin{array}{c} B \quad R_3 \\ \diagdown / \\ CH_2-C \\ | \\ N \\ | \\ \end{array}$$ (piperidine ring with R$_3$ substituents)

| No. | m | X | Y | R$_3$ | B |
|---|---|---|---|---|---|
| 28 | 0 | — | " | H | $\rangle$CH—OCOCH$_3$ |
| 29 | 0 | — | " | H | $\rangle$CH—OCOC$_{11}$H$_{23}$ |
| 30 | 0 | — | " | H | $\rangle$CH—OCO—C$_6$H$_5$ |
| 31 | 0 | — | cyclohexene-1,2-dicarbonyl (—CO—/—CO—) | H | $\rangle$CH—OCOCH$_3$ |
| 32 | 0 | — | " | H | $\rangle$CH—OCOCH(C$_2$H$_5$)(C$_4$H$_9$) |
| 33 | 0 | — | " | H | $\rangle$CH—OCOC$_{11}$H$_{23}$ |
| 34 | 0 | — | " | H | $\rangle$CH—OCO—C$_6$H$_5$ |
| 35 | 0 | — | " | H | $\rangle$CH—OCOCH$_2$CH$_2$—C$_6$H$_2$(X)(X)(OH) |
| 36 | 0 | — | 4-methylcyclohexene-1,2-dicarbonyl | H | $\rangle$CH—OCOCH$_3$ |
| 37 | 0 | — | " | H | $\rangle$CH—OCOC$_{11}$H$_{23}$ |
| 38 | 0 | — | " | H | $\rangle$CH—OCO—C$_6$H$_5$ |
| 39 | 0 | — | norbornene-2,3-dicarbonyl | H | $\rangle$CH—OCOCH$_3$ |

-continued

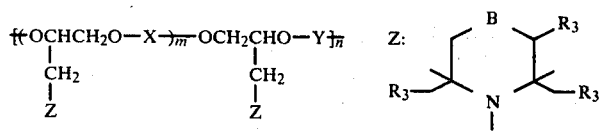

| No. | m | X | Y | R₃ | B |
|---|---|---|---|---|---|
| 40 | 0 | — | " | H | $\text{\textbackslash CH-OCOC}_{11}\text{H}_{23}$ |
| II-41 | 0 | — | $-CO(CH_2)_2CO-$ | H | $\text{\textbackslash CH-OCOCH}_3$ |
| 42 | 0 | — | " | H | $\text{\textbackslash CH-OCOCH}(C_2H_5)(C_4H_9)$ |
| 43 | 0 | — | " | H | $\text{\textbackslash CH-OCOC}_{11}\text{H}_{23}$ |
| 44 | 0 | — | " | H | $\text{\textbackslash CH-OCO-C}_6\text{H}_5$ (benzoate) |
| 45 | 0 | — | " | H | $\text{\textbackslash CH-OCOCH}_2\text{CH}_2-\text{C}_6\text{H}_2\text{X}_2\text{OH}$ |
| 46 | 1 | $-CO(CH_2)_4CO-$ | $-CO(CH_2)_4CO-$ | H | $\text{\textbackslash CH-OCOCH}_3$ |
| 47 | 1 | " | " | H | $\text{\textbackslash CH-OCO-C}_6\text{H}_5$ |
| 48 | 1 | $-C_6H_4-C(CH_3)_2-C_6H_4-$ | " | H | $\text{\textbackslash CH-OCOC}_{11}\text{H}_{23}$ |
| 49 | 1 | $-C_6H_{10}-C(CH_3)_2-C_6H_{10}-$ | " | H | " |
| 50 | 0 | — | phthaloyl (o-C₆H₄(CO-)₂) | H | $\text{\textbackslash CH-N(CH}_3)_2$ |
| 51 | 0 | — | " | H | $\text{\textbackslash CH-N(CH}_3)(\text{COCH}_3)$ |

-continued $-(OCHCH_2O-X)_m-OCH_2CHO-Y)_n$
         |                    |
         $CH_2$              $CH_2$
         |                    |
         Z                    Z Z:
$$\begin{array}{c} B \quad R_3 \\ \diagdown CH \diagup \\ CH_2 \quad CH_2 \\ R_3-C \quad C-R_3 \\ \diagdown N \diagup \\ | \end{array}$$

| No. | m | X | Y | R₃ | B |
|-----|---|---|---|----|----|
| 52 | 0 | — | " | H | $\diagdown CH-N\diagup^{CH_3}_{COC_6H_5}$ |
| 53 | 0 | — | " | H | $\diagdown CH-N(C_2H_5)_2$ |
| 54 | 0 | — | " | H | $\diagdown CH-N\diagup^{C_2H_5}_{CH_2C_6H_5}$ |
| 55 | 0 | — | " | H | $\diagdown CH-N\diagup^{C_2H_5}_{COCH_3}$ |
| 56 | 0 | — | " | H | $\diagdown CH-N\diagup^{C_2H_5}_{COCH(C_2H_5)(C_4H_9)}$ |
| 57 | 0 | — | " | H | $\diagdown CH-N\diagup^{C_2H_5}_{COC_{11}H_{23}}$ |
| II-58 | 0 | — | " | H | $\diagdown CH-N\diagup^{C_2H_5}_{COC_6H_5}$ |
| 59 | 0 | — | " | H | $\diagdown CH-N\diagup^{C_2H_5}_{COCH_2CH_2-C_6H_3(OH)}$ |
| 60 | 0 | — | " | H | $\diagdown CH-N(C_4H_9)_2$ |
| 61 | 0 | — | " | H | $\diagdown CH-N\diagup^{C_4H_9}_{COCH_3}$ |
| 62 | 0 | — | " | H | $\diagdown CH-N\diagup^{C_4H_9}_{COC_{11}H_{23}}$ |

-continued
| No. | m | X | Y | $R_3$ | B |
|---|---|---|---|---|---|
| 63 | 0 | — | " | H | 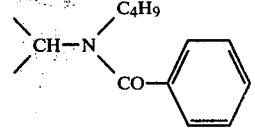 |
| 64 | 0 | — | " | H | 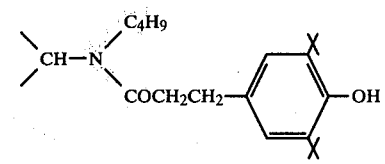 |
| 65 | 0 | — | " | H | 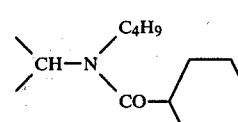 |
| 66 | 0 | — | " | H | 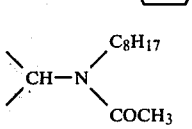 |
| 67 | 0 | — | " | H | 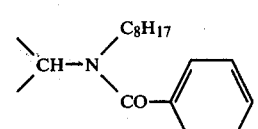 |
| 68 | 0 | — | " | H | 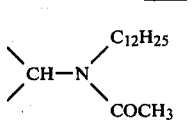 |
| 69 | 0 | — | " | H | 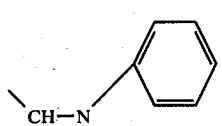 |
| 70 | 0 | — | " | H | 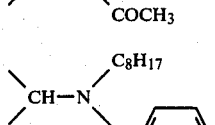 |
| 71 | 0 | — | " | H | 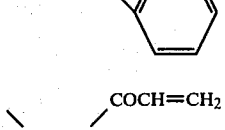 |
| 72 | 0 | — | " | H | 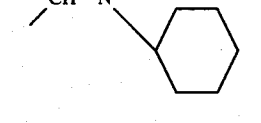 |

-continued
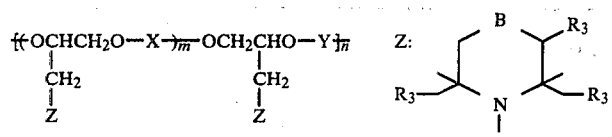
| No. | m | X | Y | R₃ | B |
|---|---|---|---|---|---|
| II-73 | 0 | — | cyclohexane-1,2-dicarbonyl | H | CH(CH₃)-N(C₂H₅)(COCH₃) |
| 74 | 0 | — | " | H | CH(CH₃)-N(C₄H₉)(COCH₃) |
| 75 | 0 | — | cyclohex-4-ene-1,2-dicarbonyl | H | CH(CH₃)-N(CH₃)(COCH₃) |
| 76 | 0 | — | " | H | CH(CH₃)-N(CH₃)(COC₆H₅) |
| 77 | 0 | — | " | H | CH(CH₃)-N(C₂H₅)(COCH₃) |
| 78 | 0 | — | " | H | CH(CH₃)-N(C₂H₅)(COC₆H₅) |
| 79 | 0 | — | " | H | CH(CH₃)-N(C₄H₉)(COCH₃) |
| 80 | 0 | — | " | H | CH(CH₃)-N(C₄H₉)(COC₆H₅) |
| 81 | 0 | — | " | H | CH₂-N(C₄H₉)(COCH₂CH₂-C₆H₂X₂-OH) |
| 82 | 0 | — | 4-methylcyclohex-4-ene-1,2-dicarbonyl | H | CH(CH₃)-N(C₂H₅)(COCH₃) |
| 83 | 0 | — | " | H | CH(CH₃)-N(C₄H₉)(COCH₃) |

-continued

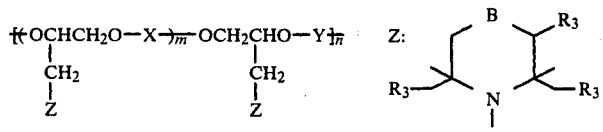

| No. | m | X | Y | R₃ | B |
|---|---|---|---|---|---|
| 84 | 0 | — | (norbornene dicarbonyl: ring with CH=CH bridge, two –CO–) | H | " |
| 85 | 0 | — | —CO(CH₂)₂CO— | H | (CH₃)₂CH–N(CH₃)(COCH₃) |
| 86 | 0 | — | " | H | (CH₃)₂CH–N(C₂H₅)(COCH₃) |
| II-87 | 0 | — | " | H | (CH₃)₂CH–N(C₄H₉)(COCH₃) |
| 88 | 0 | — | " | H | (CH₃)₂CH–N(C₄H₉)(CO–C₆H₅) |
| 89 | 0 | — | " | H | (CH₃)₂CH–N(C₄H₉)(COCH₂CH₂–C₆H₃(X)₂–OH) |
| 90 | 0 | — | —CO(CH₂)₈CO— | H | (CH₃)₂CH–N(C₄H₉)(COCH₃) |
| 91 | 1 | —CO(CH₂)₄CO— | —CO(CH₂)₄CO— | H | " |
| 92 | 1 | cyclohexane-1,2-dicarbonyl | cyclohexane-1,2-dicarbonyl | H | " |
| 93 | 1 | 2,2-bis(phenyl)propane (bisphenol A residue) | —CO(CH₂)₄CO— | H | " |
| 94 | 1 | 2,2-bis(cyclohexyl)propane | " | H | " |
| 95 | 0 | — | phthaloyl (benzene-1,2-di-CO–) | H | (CH₃)₂C(OCH₃)₂ |

-continued
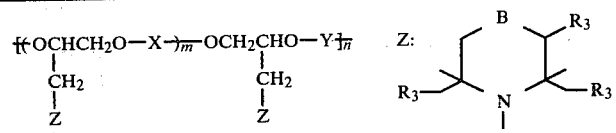
| No. | m | X | Y | R₃ | B |
|---|---|---|---|---|---|
| 96 | 0 | — | " | H | (dioxolane, gem-disubst) |
| 97 | 0 | — | " | CH₃ | " |
| 98 | 0 | — | " | H | (dioxolane with CH₃) |
| 99 | 0 | — | " | H | (1,3-dioxane) |
| 100 | 0 | — | " | H | (1,3-dioxane with CH₃) |
| II-101 | 0 | — | " | H | (dioxane with two CH₃) |
| 102 | 0 | — | " | H | (dioxolane with C₃H₇ and C₂H₅) |
| 103 | 0 | — | " | H | (dioxolane-CH₂OCOCH₃) |
| 104 | 0 | — | " | H | (dioxolane-CH₂OCOCH(C₂H₅)C₄H₉) |
| 105 | 0 | — | " | H | (dioxolane-CH₂OCOC₁₁H₂₃) |
| 106 | 0 | — | " | H | (dioxolane-CH₂OCO-phenyl) |

-continued

| No. | m | X | Y | R₃ | B |
|---|---|---|---|---|---|
| 107 | 0 | — | " | H | (dioxane)-CH₂OCOCH₂CH₂-C₆H₂(X)(X)-OH |
| 108 | 0 | — | " | H | (dioxane)(CH₃)(CH₂OCOCH₃) |
| 109 | 0 | — | " | H | (dioxane)(C₂H₅)(CH₂OCOCH₃) |
| 110 | 0 | — | " | H | (dioxane)(C₂H₅)(CH₂OCOC₁₁H₂₃) |
| 111 | 0 | — | " | H | (dioxane)(C₂H₅)(CH₂OCOCH₂CH₂-C₆H₂(X)(X)-OH) |
| 112 | 0 | — | cyclohexane-1,2-(CO—)₂ | H | (dioxane) |
| 113 | 0 | — | " | H | (dioxane)(C₂H₅)(CH₂OCOCH₃) |
| II-114 | 0 | — | cyclohexene-1,2-(CO—)₂ | H | (dioxane) |
| 115 | 0 | — | " | H | (dioxane)-CH₂OCOCH₃ |
| 116 | 0 | — | " | H | (dioxane)-CH₂OCO-C₆H₅ |
| 117 | 0 | — | " | H | (dioxane)(C₂H₅)(CH₂OCOCH₃) |

-continued $$\{(OCHCH_2O-X)_m-OCH_2CHO-Y\}_n$$
   |                    |
   CH_2                 CH_2
   |                    |
   Z                    Z Z: piperidine ring with B on N, R_3 substituents

| No. | m | X | Y | R_3 | B |
|---|---|---|---|---|---|
| 118 | 0 | — | " | H | dioxane-CH_2-C(C_2H_5)(CH_2OCOCH_2CH_2-C_6H_3-OH) |
| 119 | 0 | — | 4-methylcyclohex-4-ene-1,2-dicarbonyl (−CO−...−CO−) | H | dioxane |
| 120 | 0 | — | norbornene-2,3-dicarbonyl (−CO−...−CO−) | H | dioxane |
| 121 | 0 | — | −CO(CH_2)_2CO− | H | dioxane |
| 122 | 0 | — | " | H | dioxane-CH_2OCOCH_3 |
| 123 | 0 | — | " | H | dioxane-CH_2OCO-C_6H_5 |
| 124 | 0 | — | " | H | dioxane-C(C_2H_5)(CH_2OCOCH_3) |
| 125 | 1 | −CO(CH_2)_4CO− | −CO(CH_2)_4CO− | H | dioxane |
| 126 | 1 | −C_6H_4−C(CH_3)_2−C_6H_4− | " | H | " |
| 127 | 1 | −C_6H_10−C(CH_3)_2−C_6H_10− | " | H | " |
| 128 | 1 | −CH_2CH_2− | " | H | " |

-continued
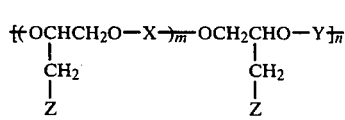
| No. | m | X | Y | R₃ | B |
|---|---|---|---|---|---|
| II-129 | 0 | — | (phthaloyl: 1,2-C₆H₄(CO—)₂) | H | (2,2,5,5-tetramethyl-3-methylamino-carbonyl-... ) N-CH₃ |
| 130 | 0 | — | " | H | N—C₄H₉ |
| 131 | 0 | — | " | H | N—C₈H₁₇ |
| 132 | 0 | — | " | CH₃ | " |
| 133 | 0 | — | " | H | N—C₁₂H₂₅ |
| 134 | 0 | — | " | H | N—C₁₈H₃₇ |
| 135 | 0 | — | " | H | N—CH₂CH=CH₂ |
| 136 | 0 | — | " | H | N—CH₂—C₆H₅ |

-continued

| No. | m | X | Y | R₃ | B |
|---|---|---|---|---|---|
| 137 | 0 | — | " | H | (structure: carbonyl-N(CH₂-aryl-OH with X,X substituents)-isopropylidene-NH-C(=O)) |
| 138 | 0 | — | " | H | (structure: N—CH₂CH₂OCOCH₃) |
| 139 | 0 | — | " | H | (structure: N—CH₂CH₂OCOCH(C₂H₅)(C₄H₉)) |
| II-140 | 0 | — | " | H | (structure: N—CH₂CH₂OCOC₁₁H₂₃) |
| 141 | 0 | — | " | H | (structure: N—CH₂CH₂OCOCH=CH₂) |
| 142 | 0 | — | " | H | (structure: N—CH₂CH₂OCO-phenyl) |
| 143 | 0 | — | " | H | (structure: N—CH₂CH₂OCOCH₂CH₂-aryl-OH with X,X substituents) |

-continued
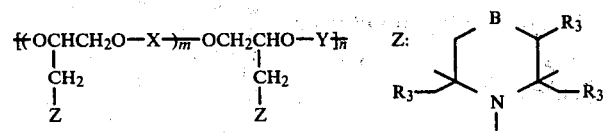
| No. | m | X | Y | $R_3$ | B |
|---|---|---|---|---|---|
| 144 | 0 | — | " | H | (cyclic structure with N—CH$_2$CHOCOCH$_3$, CH$_3$) |
| 145 | 0 | — | " | H | (cyclic structure with N—CH$_2$CHOCOCH$_3$, phenyl) |
| 146 | 0 | — | " | H | (cyclic structure with N—CH$_2$COOC$_2$H$_5$) |
| 147 | 0 | — | cyclohexane-1,2-dicarbonyl | H | (cyclic structure with N—CH$_3$) |
| 148 | 0 | — | " | H | (cyclic structure with N—C$_4$H$_9$) |
| 149 | 0 | — | " | H | (cyclic structure with N—C$_8$H$_{17}$) |
| 150 | 0 | — | " | H | (cyclic structure with N—C$_{12}$H$_{25}$) |
| II-151 | 0 | — | " | H | (cyclic structure with N—C$_{18}$H$_{37}$) |

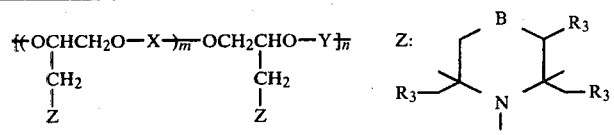

| No. | m | X | Y | R₃ | B |
|---|---|---|---|---|---|
| 152 | 0 | — | " | H | (structure: N-CH₂CH₂OCOCH₂CH₂-phenyl-OH with diketopiperazine) |
| 153 | 0 | — | cyclohexene-1,2-dicarbonyl (—CO—...—CO—) | H | (structure: N—C₄H₉ with diketopiperazine) |
| 154 | 0 | — | " | H | (structure: N—C₈H₁₇ with diketopiperazine) |
| 155 | 0 | — | " | H | (structure: N—C₁₂H₂₅ with diketopiperazine) |
| 156 | O | — | " | H | (structure: N—CH₂CH₂OCOCH₃ with diketopiperazine) |
| 157 | 0 | — | " | H | (structure: N—CH₂CH₂OCOCH(C₂H₅)(C₄H₉) with diketopiperazine) |
| 158 | 0 | — | " | H | (structure: N—CH₂CH₂OCOC₁₁H₂₃ with diketopiperazine) |
| 159 | 0 | — | " | H | (structure: N—CH₂CH₂OCO-phenyl with diketopiperazine) |

-continued
| No. | m | X | Y | R₃ | B |
|---|---|---|---|---|---|
| 160 | 0 | — | " | H | 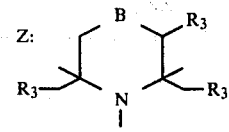 |
| 161 | 0 | — | 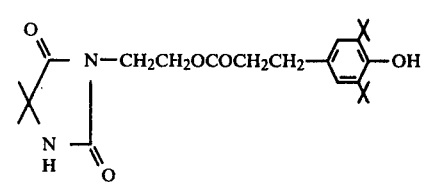 | H | 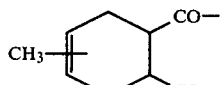 |
| II-162 | 0 | — | " | H | 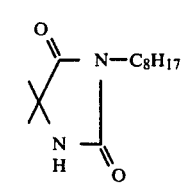 |
| 163 | 0 | — | " | H | 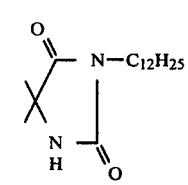 |
| 164 | 0 | — | 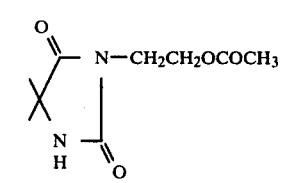 | H | 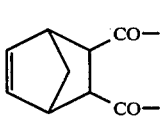 |
| 165 | 0 | — | " | H | 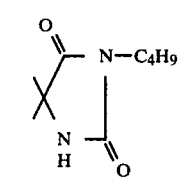 |
| 166 | 0 | — | —CO(CH₂)₂CO— | H | 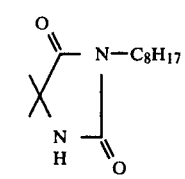 |
| 167 | 0 | — | " | H | 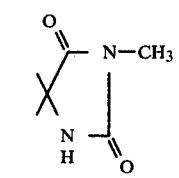 |

-continued
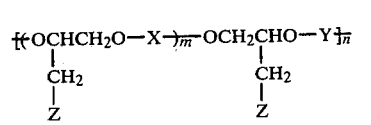    Z: 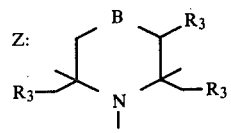
| No. | m | X | Y | $R_3$ | B |
|---|---|---|---|---|---|
| 168 | 0 | — | " | H | ![B168] N—$C_8H_{17}$ amide structure |
| 169 | 0 | — | " | H | N—$C_{12}H_{25}$ amide structure |
| 170 | 0 | — | " | H | N—$C_{18}H_{37}$ amide structure |
| 171 | 0 | — | " | H | N—$CH_2CH_2OCOCH_3$ amide structure |
| 172 | 0 | — | " | H | N—$CH_2CH_2OCOC_{11}H_{23}$ amide structure |
| II-173 | 0 | — | " | H | N—$CH_2CH_2OCOCH_2CH_2$—(aryl)—OH amide structure |
| 174 | 0 | — | —$CO(CH_2)_3CO$— | H | N—$C_8H_{17}$ amide structure |
| 175 | 0 | — | —$CO(CH_2)_4CO$— | H | " |
| 176 | 0 | — | —$COCH_2OCH_2CO$— | H | " |
| 177 | 1 | —$CO(CH_2)_2CO$— | —$CO(CH_2)_2CO$— | H | " |
| 178 | 1 | —$CO(CH_2)_4CO$— | —$CO(CH_2)_4CO$— | H | " |

-continued

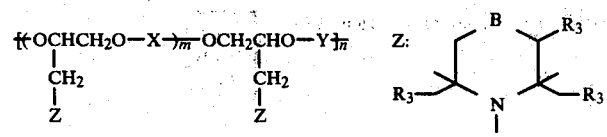

| No. | m | X | Y | $R_3$ | B |
|---|---|---|---|---|---|
| 179 | 1 | " | " | H | (structure: N-CH₂CH₂OCOCH₃ with piperidinone ring) |
| 180 | 1 | —CO(CH₂)₁₀CO— | —CO(CH₂)₁₀CO— | H | (structure: N—C₈H₁₇ with piperidinone ring) |
| 181 | 1 | phthaloyl (—CO-C₆H₄-CO—) | phthaloyl (—CO-C₆H₄-CO—) | H | " |
| 182 | 1 | bisphenol-A type (—C₆H₄—C(CH₃)₂—C₆H₄—) | —CO(CH₂)₄CO— | H | " |
| 183 | 1 | " | " | H | (structure: N—C₁₂H₂₅ with piperidinone ring) |
| 184 | 1 | " | " | H | (structure: N—CH₂CH₂OCOCH₃ with piperidinone ring) |
| 185 | 1 | " | —CH₂—C₆H₄—CH₂— | H | (structure: N—C₈H₁₇ with piperidinone ring) |
| II-186 | 1 | bisphenol-A type (—C₆H₄—C(CH₃)₂—C₆H₄—) | —CONH(CH₂)₆NHCO— | H | (structure: N—C₈H₁₇ with piperidinone ring) |
| 187 | 1 | bis(cyclohexyl)-C(CH₃)₂ type | —CO(CH₂)₄CO— | H | " |

-continued $$\{(OCHCH_2O-X\}_{\overline{m}}-OCH_2CHO-Y\}_{\overline{n}}$$
with CH$_2$–Z side chains Z: 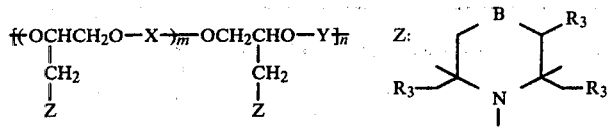

| No. | m | X | Y | R$_3$ | B |
|---|---|---|---|---|---|
| 188 | 1 | " | " | H | (structure with N—CH$_2$CH$_2$OCOCH$_2$CH$_2$—aryl—OH, piperidinone-type) |
| 189 | 1 | —⌬—CH$_2$—⌬— | " | H | (structure with N—C$_8$H$_{17}$) |
| 190 | 1 | —CH$_2$CH$_2$— | " | H | " |
| 191 | 1 | " | —(CH$_2$)$_6$— | H | " |
| 192 | 1 | " | —CO(CH$_2$)$_4$CO— | H | (structure with N—C$_{12}$H$_{25}$) |

The polymers of the invention having the formula (I) may be prepared by any one of the following methods which are performed under per se known conditions.

(1) Polymers (I-1) of formula (I) in which m is 0 may be prepared by reacting a compound (IV) with a dicarboxylic anhydride (V-1 or V-2) corresponding to the diacyl group Y.

$$Z-CH_2-CH\underset{O}{\overset{}{\diagdown}}CH_2 + R'\underset{\underset{O}{\overset{\|}{C}}}{\overset{\overset{O}{\|}}{C}}\diagup O \text{ or } +C-R'-C-O\}_{\overline{n}} \longrightarrow$$

IV    V-1    V-2

$$+OCH_2CHO-Y\}_{\overline{n}}$$
with CH$_2$–Z

I-1

(in the above formulas, Y Z and n have the meanings defined above and

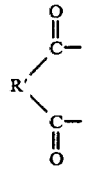

has the same meaning as above-defined Y).

The above-mentioned acid anhydrides of formula (V-2) and disclosed, e.g. in J. Am. Chem. Soc., 52, 4110–4114 (1930) and Ibid. 54, 1569–1579 (1932).

The reaction may be performed in the presence or absence of an inert organic solvent by heating at 110°–220° C., preferably 130°–200° C. As the solvent, are preferably employed, e.g. ethers such as diethyleneglycol dimethyl ether or diethyleneglycol diethyl ether; aromatic hydrocarbons such as xylene, chlorobenzene or p-dichlorobenzene; aliphatic hydrocarbons such as n-octane, ethylcyclohexane or isoparaffin mixtures.

Usually, the reaction may preferably be performed in the absence of a solvent.

(2) Polymers(I-2) of formula in which m is 1 may be prepared by reacting a compound (VI) with a reactive derivative of group Y.

$$HO-CH-CH_2-O-X-O-CH_2-CH-OH + \text{reactive derivative of group Y} \longrightarrow$$
with CH$_2$–Z on each CH

VI

-continued $$+O-\underset{\underset{Z}{\overset{|}{CH_2}}}{\overset{|}{C}}HCH_2O-X-OCH_2\underset{\underset{Z}{\overset{|}{CH_2}}}{\overset{|}{C}}HO-Y+_{\overline{n}}$$

I-2

(in the above formulas, X, Y, Z and n have the meanings defined above.).

(2-1) When the group Y is a saturated aliphatic diacyl group having up to 20 carbon atoms, benzenedicarbonyl group or cyclohexanedicarbonyl group, the desired compounds may be obtained by reacting an active derivative of a dicarboxylic acid corresponding to the reactive derivative of the group Y, e.g. dicarboxylic dihalide, di-lower alkyl ester of dicarboxylic acid or dithiol ester of dicarboxylic acid with a compound of formula (VI), affording the desired compound (I-2).

(a) When a dicarboxylic dihalide is used, the reaction is advantageously performed in the presence of an acid-binding agent in an inert organic solvent. As the solvent, are preferably employed, e.g. aromatic hydrocarbons such as benzene, toluene or xylene; halogenoaliphatic hydrocarbons such as chloroform or trichlorethane; ethers such as diethylether, tetrahydrofuran or dioxane.

As the acid-binding agent are preferably employed, e.g. alkali metal hydroxides such as sodium hydroxide or potassium hydroxide; alkali metal carbonates such as sodium carbonate or potassium carbonate; organic bases such as triethylamine or pyridine. The reaction is ordinarily performed at 0°–130° C.

(b) When a di-lower alkyl ester of dicarboxylic acid is used, the reaction is preferably performed in the presence of a strong base in an inert organic solvent.

As the solvent, are preferably employed, e.g. aromatic or aliphatic hydrocarbons such as benzene, toluene, xylene, n-heptane, n-octane or isooctane. As the strong base are preferably employed strong basic alkali metal compounds such as sodium methylate, sodium ethylate, potassium hydroxide or lithium amide, or titanate compounds such as tetraisopropyl or tetrabutyl titanate. The reaction is advantageously performed ordinarily by heating at 80°–180° C.

(c) When a dithiol ester of dicarboxylic acid is used, the reaction is performed in the presence or absence of an inert organic solvent. As the solvent are preferably employed aliphatic hydrocarbons such as n-hexane, n-heptane, n-octane, isooctane or isoparaffin mixtures; aromatic hydrocarbons such as benzene, toluene, xylene or chlorobenzene; ethers such as diethyleneglycol dimethylether, diethyleneglycol diethylether, tetrahydrofuran or dioxane.

The reaction is advantageously performed ordinarily by heating at 60°–180° C.

(2-2) When the group Y is an alkylene group having from 3 to 10 carbon atoms, xylylene group or a group of formula $-CH_2-\langle\!\!\langle\phantom{x}\rangle\!\!\rangle\!\!-\!\!\langle\!\!\langle\phantom{x}\rangle\!\!\rangle-CH_2-,$ the desired compounds (I-2) may be obtained by reacting a dihalogeno compound corresponding to the reactive derivative of group Y with a compound of formula (VI).

The reaction is performed first by reacting a strong basic alkali metal compound such as sodium hydride or potassium tert-butyrate, then by reacting a halide of the desired group in an inert organic solvent such as dimethylformamide, toluene, xylene, tetrahydrofuran or dioxane. The reaction is ordinarily performed by heating at 50°–120° C.

(2-3) When the group Y is a group of formula —CONH—R$_2$—NHCO—, the desired compounds may be obtained by reacting a diisocyanate having the formula CON—R$_2$—HCO as the reactive derivative of group Y with a compound having the formula (VI), affording the desired compound I-2.

The reaction is performed in the presence or absence of an inert organic solvent. As the solvent are preferably employed aromatic hydrocarbons such as benzene, toluene or xylene; ethers such as dioxane or tetrahydrofuran. The reaction is ordinarily performed at 50°–200° C.

The starting compounds of formula (VI) may be prepared by any one of the following methods.

$$Z'-H + CH_2\!\!\underset{\diagdown\!\!\diagup}{\overset{}{\phantom{x}}}\!\!CH-CH_2O-X-OCH_2-CH\!\!\underset{\diagdown\!\!\diagup}{\overset{}{\phantom{x}}}\!\!CH_2 \longrightarrow \quad (1)$$
$$\phantom{Z'-H + CH_2\!\!}O\phantom{-CH-CH_2O-X-OCH_2-CH\!\!}O$$
VII $\phantom{xxxxxxxxxxxxxxxxxxxxxx}$ VIII $$HO-\underset{\underset{Z'}{\overset{|}{CH_2}}}{\overset{|}{C}}HCH_2O-X-OCH_2\underset{\underset{Z'}{\overset{|}{CH_2}}}{\overset{|}{C}}H-OH$$

VI-1

$$Z-CH_2-CH\!\!\underset{\diagdown\!\!\diagup}{\overset{}{\phantom{x}}}\!\!CH_2 + HO-X'-OH \longrightarrow \quad (2)$$
$$\phantom{Z-CH_2-}O$$
IV $\phantom{xxxxxxx}$ IX $$HO-\underset{\underset{Z}{\overset{|}{CH_2}}}{\overset{|}{C}}HCH_2O-X'-OCH_2\underset{\underset{Z}{\overset{|}{CH_2}}}{\overset{|}{C}}H-OH$$

VI-2

(in the above formulas, Z' has the same meaning as above-defined formula (II) in which A is a group of formula $$-\underset{\underset{R_5}{\overset{|}{N}}}{\overset{}{N}}-CH\!\!\underset{\diagdown}{\overset{\diagup}{\phantom{x}}} \quad \text{or} \quad -N\!\!\underset{\diagdown}{\overset{\diagup}{\phantom{x}}}\!\!\underset{\diagdown\phantom{x}\diagup}{\overset{O}{\underset{O\phantom{xx}H}{\underset{\diagdown}{\overset{\diagup}{\phantom{x}}}\!\!N}}},$$

or as above-defined formula (III), X' is a saturated aliphatic diacyl group having up to 20 carbon atoms, benzenedicarbonyl group, cyclohexanedicarbonyl group or a group of formula

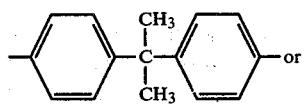 or

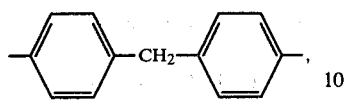, and Y and Z have the meanings defined above).

The reactions may be performed in the presence or absence of an inert organic solvent, preferably by heating at 50°–180° C.

As the solvent are preferably employed, e.g. ethers such as dioxane or diethyleneglycol dimethylether; alkylamides such as dimethylformamide or dimethylacetamide; chlorinated or non-chlorinated aromatic hydrocarbons such as benzene, toluene, xylene, chlorobenzene or p-dichlorobenzene; alcohols such as t-butanol or n-octanol.

The starting compounds IV may be prepared by reacting a compound having the formula VII or an alkali metal salt thereof, if necessary, with epichlorohydrin or epibromohydrin (X).

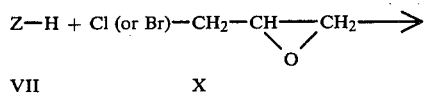

VII     X

IV (in the above formulas, Z has the meaning defined above).

The reaction may be performed in the presence or absence of an inert organic solvent, preferably in the presence of the same, at an ambient temperature to 100° C.

As the solvent those mentioned in the preparation of compounds of formula VI may be used.

Starting compounds VII are disclosed in the following patent specifications:

Compounds Z-H in which Z is formula II or III and A is —O—CH< and B is $R_7$O—CH< are in Japanese Patent Provisional Publication Nos. 50-5434 and 51-139841 and Japanese Patent Publication No. 46-42618; those in which A is

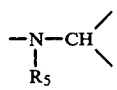

and B is

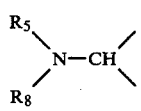

are in Japanese Patent Provisional Publication Nos. 49-57046 and 51-143673 and Japanese Patent Publication No. 48-3211; those in which A is

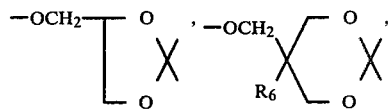

and B is

are in Japanese Patent Provisional Publication Nos. 49-64635 and 51-143674 and Japanese Patent Publication No. 47-8538; those in which A is

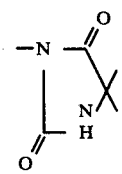

and B is

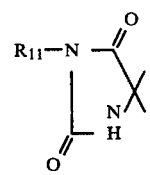

are in Japanese Patent Provisional Publication Nos. 49-61237 and 51-139842 and Japanese Patent Publication Nos. 46-22105 and 46-43304; those in which B is $CH_2<$ are in Japanese Patent Publication No. 46-31733 and Japanese Patent Provisional Publication No. 51-142046.

The polymers of formula (I) according to the invention are less thermovolatile and stabilize effectively wide varieties of synthetic polymers against light- and heat-degradation thereof.

Synthetic polymers stabilized in this way include: olefin and diene polymers including homopolymers of olefins and dienes (e.g. low-density, high-density and cross-linked polyethylenes, polypropylene, polyisobutylene, polymethylbutene-1, polymethylpentene-1, polyisoprene, and polybutadiene), mixtures of such homopolymers (e.g. mixtures of polypropylene and polyethylene, polypropylene and polybutene-1, or polypropylene and polyisobutylene), and copolymers of olefins and dienes (e.g. ethylene/propylene copolymers, propylene/butene-1 copolymers, propylene/isobutylene copolymers, ethylene/butene-1 copolymers, and terpolymers of ethylene and propylene with dienes such as hexadiene, dicyclopentadiene or ethylidene norbornene);

styrene polymers including polystyrene, copolymers of styrene and of α-methylstyrene (e.g. styrene/butadiene copolymers, styrene/acrylonitrile copolymers, styrene/acrylonitrile/methylmethacrylate copolymers, styrene/acrylonitrile/acrylic ester copolymers, styrene/acrylonitrile copolymers modified with acrylic ester polymers to provide impact strength, and styrene polymers modified with ethylene/propylene/diene elastomers to provide impact strength), and graft copolymers of styrene (e.g. polymers in which styrene is grafted onto polybutadiene, and polymers in which styrene and acrylonitrile are grafted onto polybutadiene as well as mixtures thereof with the aforementioned styrene copolymers commonly known as acrylonitrile/butadiene/styrene or AB3 plastics);

halogenated vinyl and vinylidene polymers including polyvinyl chloride, polyvinylidene chloride, polyvinyl fluoride, polychloroprene, chlorinated rubbers, vinyl chloride/vinylidene chloride copolymers, vinyl chloride/vinyl acetate copolymers, and vinylidene chloride/vinyl acetate copolymers;

polymers derived from α,β-unsaturated acids and derivatives thereof, including polyacrylates and polymethacrylates, polyacrylic amides and polyacrylonitrile;

polymers derived from unsaturated alcohols and amines and from the acyl derivatives thereof or acetals, including polyvinyl alcohol, polyvinyl acetate, polyvinyl stearate, polyvinyl benzoate, polyvinyl maleate, polyvinyl butyral, polyallyl phthalate, and polyallyl melamine, and copolymers thereof with other ethylenically unsaturated monomers (e.g. ethylene/vinyl acetate copolymers);

epoxy polymers including homopolymers and copolymers derived from epoxides (e.g. polyethylene oxide), and polymers derived from bisglycidyl ethers;

polyacetals, polyalkylene oxides and polyphenylene oxides including polyoxymethylene, oxymethylene/ethylene oxide copolymers, polyoxyethylene, polypropylene oxide, polyisobutylene oxide and polyphenylene oxides;

polyurethanes and polyureas;

polycarbonates;

polysulphones;

polyamides and copolyamides derived from diamines and dicarboxylic acids and/or from aminocarboxylic acids or the corresponding lactams, including nylon-6, nylon-6,6, nylon-6,10, nylon-11 and nylon-12;

polyesters derived from dicarboxylic acids and dialcohols and/or from hydroxycarboxylic acids and the corresponding lactones, e.g. polyethylene glycol terephthalate and poly-1,4-dimethylolcyclohexane terephthalate;

cross-linked polymers derived from aldehydes together with phenols, ureas or melamines, e.g. phenol/formaldehyde, urea/formaldehyde and melamine/formaldehyde resins;

alkyd resins e.g. glycerol/phthalic acid resins and mixtures thereof with melamine/formaldehyde regins;

unsaturated polyester resins derived from copolyesters of saturated and unsaturated dicarboxylic acids with polyhydric alcohols as well as from vinyl compounds as cross-linking agents, and also halogenated flame-resistant modifications thereof.

The amount of the stabilizers of the invention needed for effective stabilization of organic polymers will depend on a variety of factors, such as the type and property of the polymer concerned, its intended use, and the presence of other stabilizers. It is generally satisfactory to use from 0.01% to 5% by weight of the stabilizers of the invention, based on the weight of the polymer, but the most effective range will vary with the type of polymer: viz. 0.01% to 2.0%, preferably 0.02% to 1.0%, by weight for olefin, diene and styrene polymers; 0.01% to 1.0%, preferably 0.02% to 0.5%, by weight for vinyl and vinylidene polymers; and 0.01% to 5.0%, preferably 0.02% to 2.0%, by weight for polyurethanes and polyamides. If desired, two or more of the stabilizers of the invention may be used together.

The stabilizers of the invention may readily be incorporated into organic polymers by conventional techniques at any convenient stage prior to the manufacture of shaped articles therefrom. For example, the stabilizer may be mixed with the polymer in dry powder form, or a suspension or emulsion of the stabilizer may be mixed with a solution, suspension or emulsion of the polyme.

The stabilized polymeric compositions of the invention may optionally contain one or more of various additives conventionally used in polymer technology, such as the additives listed in British Patent Specification No. 1,401,924, at pages 11-13.

The invention is further illustrated by the following Examples in which the mean molecular weight was measured by the vapor pressure method, and all parts and percentages are in weight.

EXAMPLE 1

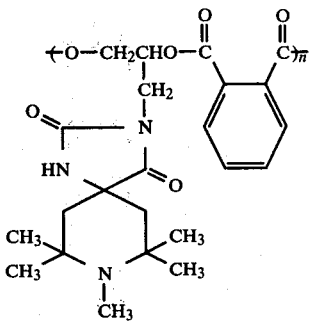

A mixture of 2.95 g of 3-(2,3-epoxypropyl)-7,7,8,9,9-pentamethyl-1,3,8-triazaspiro[4.5]decane-2,4-dione and 1.48 g of phthalic anhydride was heated at 200° C. for 1 hour. After completion of the reaction, the reaction mixture was dissolved in 1,2-dichlorethane and the solution was added dropwise to n-hexane, under stirring. The resulting precipitate was collected by filtration and dried, giving the desired compound (1) as yellow powder softening at 165°-210° C. and having a mean molecular weight of 1,860.

EXAMPLE 2

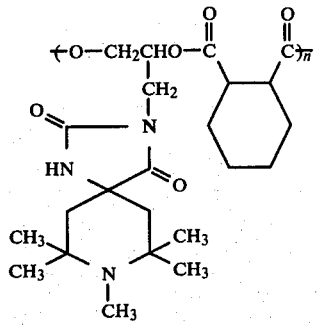

A mixture f 2.95 g of 3-(2,3-epoxypropyl)-7,7,8,9,9-pentamethyl-1,3,8-triazaspiro[4.5]decane-2,4-dione and 1.54 g of 1,2-cyclohexanedicarboxylic anhydride was heated at 200° C. for 4 hours. After completion of the reaction, the reaction mixture was treated in the similar manner as in Example 1, giving the desired compound (2) as pale yellow powder softening at 155°-171° C. and having a mean molecular weight of 1,780.

EXAMPLE 3

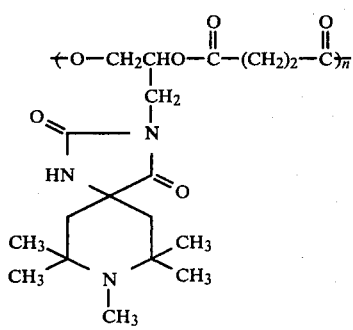

A mixture of 4.9 g of 3-(2,3-epoxypropyl)-7,7,8,9,9-pentamethyl-1,3,8-triazaspiro[4.5]decane-2,4-dione and 2.0 g of succinic anhydride was heated at 200° C. for 3 hours. After completion of the reaction, the reaction mixture was purified by column chromatography on silica gel(eluent: ethyl acetate:methanol:triethylamine 1:1:0.2). The product thus obtained was purified in the similar manner as in Example 1, giving the desired compound (3) as pale brown powder softening at 137°-157° C. and having a mean molecular weight of 1,270.

EXAMPLE 4

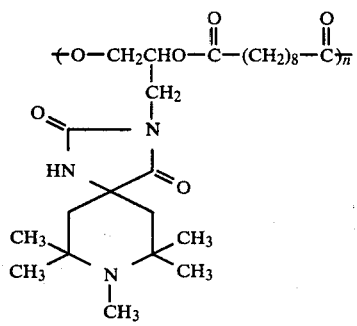

A mixture of 4.5 g of 3-(2,3-epoxypropyl)-7,7,8,9,9-pentamethyl-1,3,8-triazaspiro[4.5]decane-2,4-dione and sebacic anhydride was heated at 200° C. for 6 hours. After completion of the reaction, the reaction mixture was subjected to column chromatography on silica gel and eluted first with a mixture of ethyl acetate:methanol = 1:1, followed with a mixture of ethyl acetate:-methanol:triethylamine = 1:1:0.2. The eluate eluted with the latter solvent system was taken out and the solvent was removed, giving the desired compound (4) as pale yellow powder softening at 63°-65° C. and having a mean molecular weight of 2,300.

EXAMPLE 5

-continued

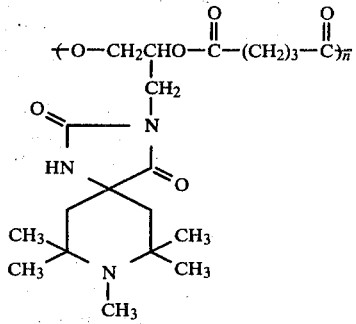

A mixture of 2.95 g of 3-(2,3-epoxypropyl)-7,7,8,9,9-pentamethyl-1,3,8-triazaspiro[4.5]decane-2,4-dione and 1.1 g of glutaric anhydride in 5 ml of diethyleneglycol dimethylether was refluxed for 10 hours. After completion of the reaction, the reaction mixture was subjected to column chromatography and eluted first with a mixture of ethyl acetate:methanol = 3:2, followed with a mixture of ethyl acetate:methanol:trimethylamine = 1:1:0.1.

The eluate eluted with the latter solvent system was taken out and the solvent was removed therefrom, giving the desired compound (5) as pale yellowish white powder softening at 90°-100° C. and having a mean molecular weight of 2,590.

EXAMPLE 6

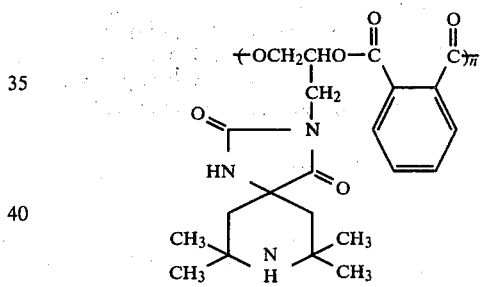

A mixture of 1.4 g of 3-(2,3-epoxypropyl)-7,7,9,9-tetramethyl-1,3,8-triazaspiro[4.5]decane-2,4-dione and 0.75 g of phthalic anhydride was heated at 150°-160° C. for 15 minutes under a nitrogen stream. After completion of the reaction, the reaction mixture was dissolved in chloroform and the solution was added dropwise to n-hexane, under stirring. The resulting precipitate was collected by filtration, giving the desired compound (6) as white powder softening at 170°-190° C. and having a mean molecular weight of 4,200.

EXAMPLE 7

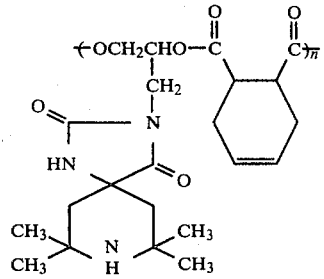

A mixture of 1.4 g of 3-(2,3-epoxypropyl)-7,7,9,9-tetramethyl-1,3,8-triazaspiro[4.5]decane-2,4-dione and 0.75 g of cis-4-cyclohexene-1,2-dicarboxylic anhydride was heated at 150°–160° C. for 15 minutes, under a nitrogen stream. After completion of the reaction, the reaction mixture was treated in the similar manner as in Example 6, giving the desired compound (7) as white powder softening at 165°–185° C. and having a mean molecular weight of 2,100.

EXAMPLE 8

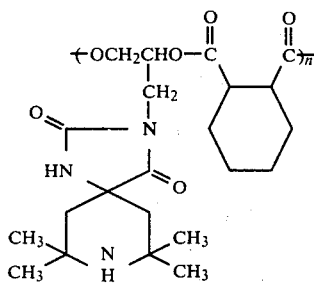

A mixture of 1.4 g of 3-(2,3-epoxypropyl)-7,7,9,9-tetramethyl-1,3,8-triazaspiro[4.5]decane-2,4-dione and 0.76 g of a 1,2-cyclohexanedicarboxylic anhydride was heated at 150°–160° C. for 15 minutes, under a nitrogen stream. After completion of the reaction, the reaction mixture was treated in the similar manner as in Example 6, giving the desired compound (8) as white powder softening at 165°–180° C. and having a mean molecular weight of 2,800.

EXAMPLE 9

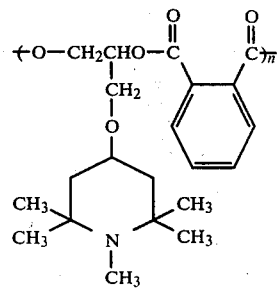

A mixture of 1.5 g of 1,2,2,6,6-pentamethyl-4-(2,3-epoxypropoxy)piperidine and 0.97 g of phthalic anhydride was heated at 150°–160° C. for 3 hours, under a nitrogen stream. After completion of the reaction, the reaction mixture was treated in the similar manner as in Example 6, giving the desired compound (9) as white powder softening at 97°–99° C. and having a mean molecular weight of 2,700.

EXAMPLE 10

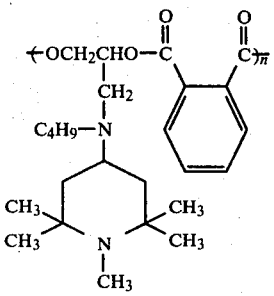

A mixture of 0.9 g of 4-[N-(2,3-epoxypropyl)-butylamine]-1,2,2,6,6-pentamethylpiperidine and 0.47 g of phthalic anhydride was heated at 150°–160° C. for 1 hour under a nitrogen stream. After completion of the reaction, the reaction mixture was dissolved in benzene and the solution was added dropwise to n-hexane, under stirring. The resulting precipitate was collected by filtration, giving the desired compound (10) as grayish white powder softening at 107°–115° C. and having a mean molecular weight of 2,580.

EXAMPLE 11

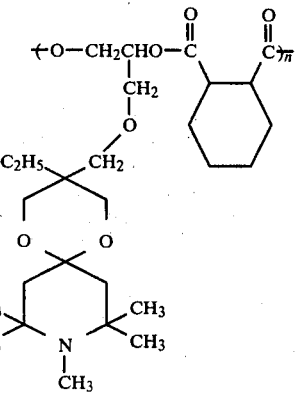

A mixture of 3.41 g of 3-(2,3-epoxypropoxymethyl)-3-ethyl-8,8,9,10,10-pentamethyl-1,5-dioxa-9-azaspiro[5.5]undecane and 1.54 g of 1,2-cyclohexanedicarboxylic anhydride was heated at 160° C. for 5 hours, under an argon stream. After completion of the reaction, the reaction mixture was purified by column chromatography on silica gel, eluted first with a mixture of benzene:ethyl acetate:n-hexane:triethylamine=5:5:5:1, then with a mixture of ethyl acetate:triethylamine=5:1. The eluate eluted with the former solvent system was further purified by thin layer chromatography on silica gel (developing solvent: ethyl acetate:benzene:ethanol:triethylamine=8:1:1:1), giving the desired compound (11-A) as yellow liquid showing the $R_f$ value of 0.90. The eluate eluated with the latter solvent system was evaporated, giving the desired compound (11-B) as pale yellow solid softening at 55°–66° C. The mean molecular weight of the desired compounds 11-A and 11-B were 1,800 and 2,600, respectively.

EXAMPLE 12

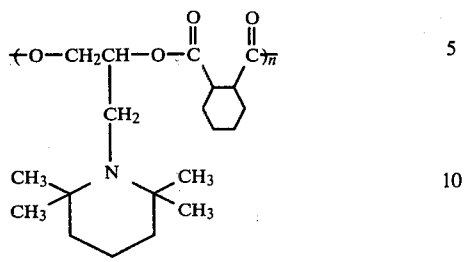

A mixture of 2.0 g of 1-(2,3-epoxypropyl)-2,2,6,6-tetramethylpiperidine and 1.5 g of 1,2-cyclohexanedicarboxylic anhydride was heated at 150°–160° C. for 4 hours, under a nitrogen stream. After completion of the reaction, the reaction mixture was allowed to cool to an ambient temperature, giving the desired compound (12) as a pale yellow vitreous solid softening at 118°–123° C. and having a mean molecular weight of 3,650.

EXAMPLE 13

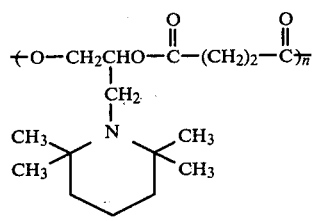

A mixture of 2.0 g of 1-(2,3-epoxypropyl)-2,2,6,6-tetramethylpiperidine and 1.0 g of succinic anhydride was heated at 150°–160° C. for 4 hours, under a nitrogen stream. After completion of the reaction, the reaction mixture was subjected to column chromatography on silica gel and eluted first with benzene. Removal of the solvent from the eluate gave the desired compound (13-A) as a pale red vitreous solid softening at 60°–65° C. and having a mean molecular weight of 3,970.

Similarly, the second eluate with ethyl acetate was treated, giving the desired compound (13-B) as a pale red vitreous solid softening at 57°–60° C. and having a mean molecular weight of 1,430.

Further, the third eluate with ethyl acetate:triethylamine=20:1 was treated similarly, giving the desired compound (13-C) as pale red vitreous solid softening at 57°–60° C. and having a mean molecular weight of 1,370.

EXAMPLE 14

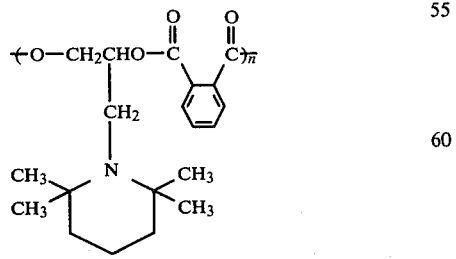

A mixture of 2.0 g of 1-(2,3-epoxypropyl)-2,2,6,6-tetramethylpiperidine and 1.5 g of phthalic anhydride was heated at 150°–160° C. for 5 hours, under a nitrogen stream. After completion of the reaction, the reaction mixture was treated in the similar manner as in Example 6, giving the desired compound (14) as a milky white powder softening at 125°–128° C. and having a mean molecular weight of 2,550.

EXAMPLE 15

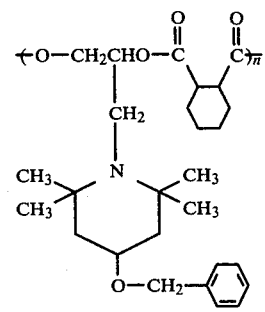

A mixture of 1.8 g of 1-(2,3-epoxypropyl)-2,2,6,6-tetramethyl-3-benzyloxypiperidine and 0.9 g of 1,2-cyclohexanedicarboxylic anhydride was refluxed in 5 ml of diethyleneglycol dimethylether for 7 hours. After completion of the reaction, the reaction mixture was subjected to column chromatography on silica gel and eluted first with a mixture of n-hexane:ethyl acetate=1:1, then with ethyl acetate. The eluate eluted with the latter solvent was taken out and the solvent was removed therefrom, giving the desired compound (15) as pale yellow powder softening at 73°–79° C. and having a mean molecular weight of 1,500.

EXAMPLE 16

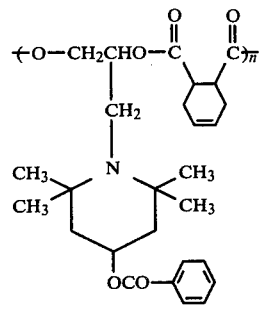

A mixture of 2.5 g of 1-(2,3-epoxypropyl)-2,2,6,6-tetramethyl-4-benzoyloxypiperidine and 1.2 g of cis-4-cyclohexene-1,2-dicarboxylic anhydride was heated at 150°–160° C. for 1 hour, under a nitrogen stream. After completion of the reaction, the reaction mixture was treated in the similar manner as in Example 10, giving the desired compound (16) as white powder, softening at 128°–135° C. and having a mean molecular weight of 2,780.

EXAMPLE 17

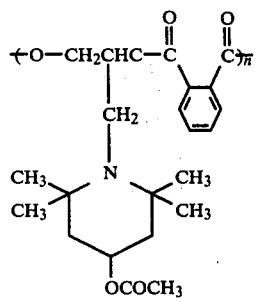

A mixture of 2.1 g of 1-(2,3-epoxypropyl)-2,2,6,6-tetramethyl-4-acetoxypiperidine and 1.2 g of phthalic anhydride was heated at 150°–160° C. for 1 hour, under a nitrogen stream. After completion of the reaction, the reaction mixture was treated in the similar manner as in Example 10, giving the desired compound (17) as white powder softening at 130°–135° C. and having a mean molecular weight of 2,070.

EXAMPLE 18

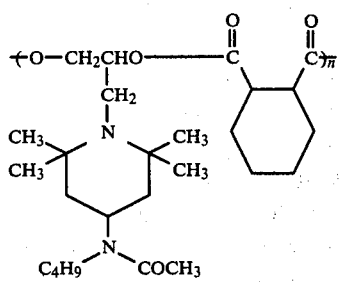

A mixture of 1.5 g of 1-(2,3-epoxypropyl)-4-(n-butylacetamido)-2,2,6,6-tetramethylpiperidine and 0.8 g of 1,2-cyclohexanedicarboxylic anhydride was heated at 200° C. for 3 hours, under a nitrogen stream. After completion of the reaction, the reaction mixture was purified by column chromatography on silica gel (eluent: ethyl acetate:triethylamine=9:1), giving the desired compound (18) as pale brown powder softening at 100°–110° C. and having a mean molecular weight of 1,800.

EXAMPLE 19

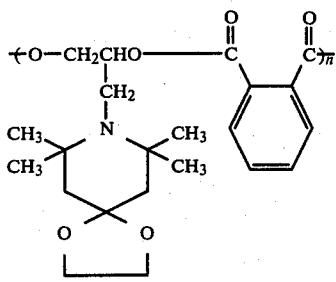

A mixture of 2.0 g of 8-(2,3-epoxypropyl)-7,7,9,9-tetramethyl-1,4-dioxa-8-azaspiro[4.5]decane and 1.2 g of phthalic anhydride was refluxed in 6 ml of xylene for 5 hours. After completion of the reaction, the reaction mixture was condensed under a reduced pressure and the resulting residue was triturated and washed with n-hexane, giving the desired compound (19) as pale yellow powder softening at 118°–128° C. and having a mean molecular weight of 1,460.

EXAMPLE 20

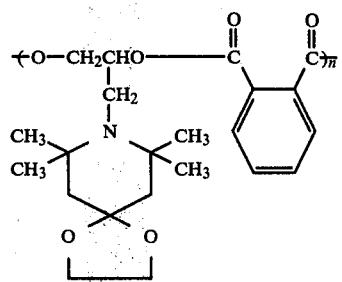

A mixture of 2.0 g of 8-(2,3-epoxypropyl)-7,7,9,9-tetramethyl-1,4-dioxa-8-azaspiro[4.5]decane and 1.2 g of phthalic anhydride was heated at 140° C. for 8 minutes, under an argon stream. After completion of the reaction, the solidified reaction product was triturated and washed with n-hexane, giving the desired compound (20) as pale yellow powder softening at 140°–150° C. and having a mean molecular weight of 3,700.

EXAMPLE 21

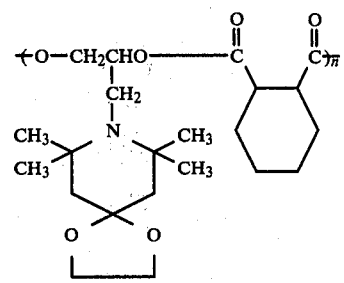

A mixture of 2.0 g of 8-(2,3-epoxypropyl)-7,7,9,9-tetramethyl-1,4-dioxa-8-azaspiro[4.5]decane and 1.2 g of 1,2-cyclohexanedicarboxylic anhydride was heated at 140° C. for 10 minutes, under an argon stream. After completion of the reaction, the solidified reaction product was treated in the similar manner as in Example 20, giving the desired compound (21) as white powder softening at 120°–130° C. and having a mean molecular weight of 5,020.

EXAMPLE 22

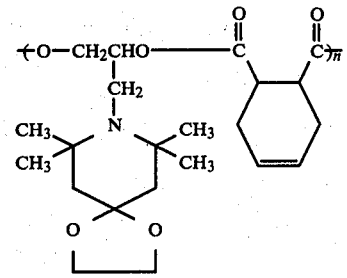

A mixture of 2.0 g of 8-(2,3-epoxypropyl)-7,7,9,9-tetramethyl-1,4-dioxa-8-azaspiro[4.5]decane and 1.2 g of cis-4-cyclohexene-1,2-dicarboxylic anhydride was heated at 180° C. for 12 minutes, under an argon stream.

After completion of the reaction, the solidified reaction product was treated in the similar manner as in Example 20, giving the desired compound (22) as white powder softening at 110°–120° C. and having a mean molecular weight of 2,360.

EXAMPLE 23

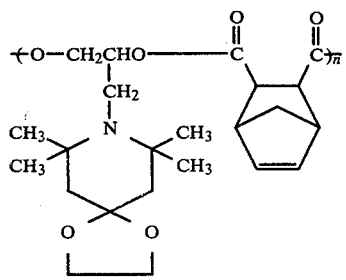

A mixture of 2.1 g of 8-(2,3-epoxypropyl)-7,7,9,9-tetramethyl-1,4-dioxa-8-azaspiro[4.5]decane and 1.4 g of 5-norbornene-2,3-dicarboxylic anhydride was heated at 185°–190° C. for 2 hours, under an argon stream. After completion of the reaction, the solidified reaction product was treated in the similar manner as in Example 20, giving the desired compound (23) as greyish white powder softening at 140°–145° C. and having a mean molecular weight of 3,300.

EXAMPLE 24

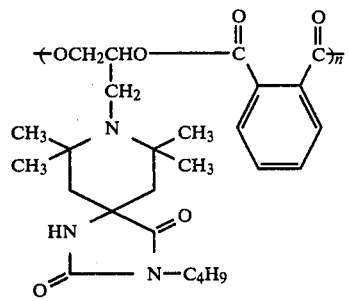

A mixture of 2.0 g of 8-(2,3-epoxypropyl)-3-n-butyl-7,7,9,9-tetramethyl-1,3,8-triazaspiro[4.5]decane and 0.88 g of phthalic anhydride was heated at 150°–160° C. for 1 hour, under a nitrogen stream. After completion of the reaction, the reaction mixture was treated in the similar manner as in Example 6, giving the desired compound (24) as white powder softening at 158°–165° C. and having a mean molecular weight of 3,440.

EXAMPLE 25

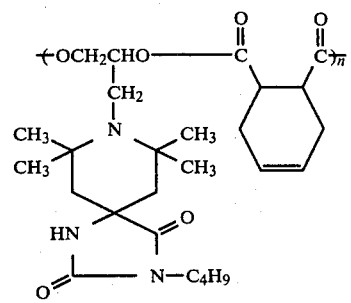

A mixture of 2.0 g of 8-(2,3-epoxypropyl)-3-n-butyl-7,7,9,9-tetramethyl-1,3,8-triazaspiro[4.5]decane-2,4-diene and 0.9 g of cis-4-cyclohexene-1,2-dicarboxylic anhydride was heated at 150°–160° C. for 1 hour, under a nitrogen stream. After completion of the reaction, the reaction mixture was treated in the similar manner as in Example 6, giving the desired compound (25) softening at 136°–143° C. and having a mean molecular weight of 3,310.

EXAMPLE 26

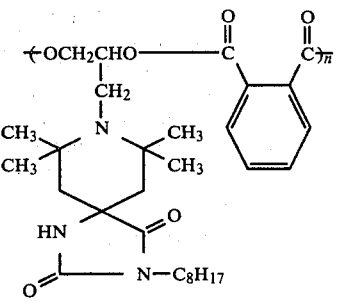

A mixture of 3.0 g of 8-(2,3-epoxypropyl)-3-octyl-7,7,9,9-tetramethyl-1,3,8-triazaspiro[4.5]decane-2,4-dione and 1.12 g of phthalic anhydride was heated at 150°–160° C. for 1 hour, under a nitrogen stream. After completion of the reaction, the reaction mixture was treated in the similar manner as in Example 10, giving the desired compound (26) as white powder softening at 125°–130° C. and having a mean molecular weight of 2,770.

EXAMPLE 27

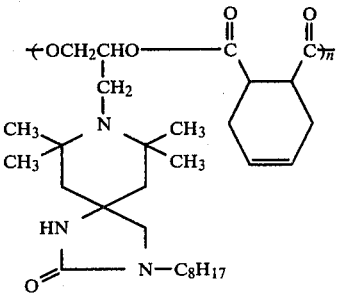

A mixture of 2.5 g of 8-(2,3-epoxypropyl)-3-octyl-7,7,9,9-tetramethyl-1,3,8-triazaspiro[4.5]decane-2,4-dione and 0.96 g of cis-4-cyclohexene-1,2-dicarboxylic anhydride was heated at 150°–160° C. for 1 hour, under a nitrogen stream. After completion of the reaction, the reaction mixture was treated in the similar manner as in Example 10, giving the desired compound (27) as white powder softening at 122°–127° C. and having a mean molecular weight of 2,750.

EXAMPLE 28

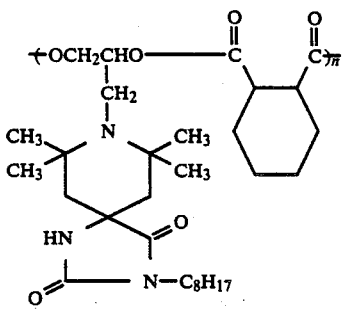

A mixture of 2.5 g of 8-(2,3-epoxypropyl)-3-octyl-7,7,9,9-tetramethyl-1,3,8-triazaspiro[4.5]decane-2,4-dione and 1.0 g of 1,2-cyclohexane-dicarboxylic anhydride was heated at 150°–160° C. for 1 hour, under a nitrogen stream. After completion of the reaction, the reaction mixture was treated in the similar manner as in Example 10, giving the desired compound (28) as white powder softening at 105°–110° C. and having a mean molecular weight of 1,640.

EXAMPLE 29

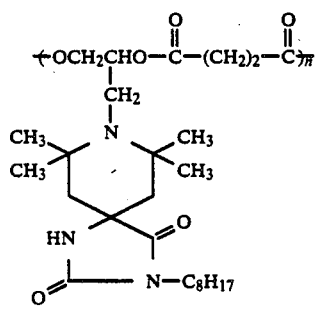

A mixture of 2.0 g of 8-(2,3-epoxypropyl)-3-octyl-7,7,9,9-tetramethyl-1,3,8-triazaspiro[4.5]decane-2,4-dione and 0.5 g of succinic anhydride was heated at 150°–160° C. for 1 hour, under a nitrogen stream. After completion of the reaction, the reaction mixture was treated in the similar manner as in Example 6, giving the desired compound (29) as greyish white powder softening at 94°–98° C. and having a mean molecular weight of 2,620.

EXAMPLE 30

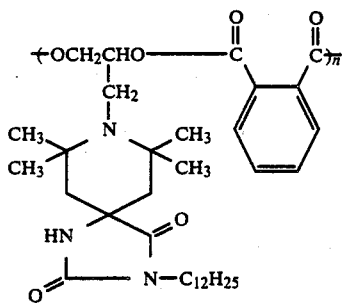

A mixture of 2.0 g of 8-(2,3-epoxypropyl)-3-dodecyl-7,7,9,9-tetramethyl-1,3,8-triazaspiro[4.5]decane-2,4-dione and 0.66 g of phthalic anhydride was heated at 150°–160° C. for 1 hour, under a nitrogen stream. After completion of the reaction, the reaction mixture was treated in the similar manner as in Example 10, giving the desired compound (30) as white powder softening at 112°–117° C. and having a mean molecular weight of 3,160.

EXAMPLE 31

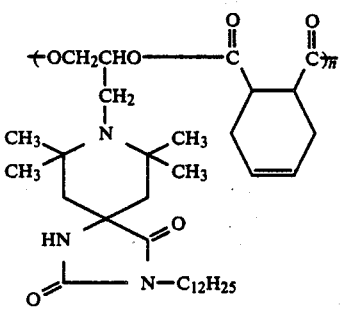

A mixture of 2.0 g of 8-(2,3-epoxypropyl)-3-dodecyl-7,7,9,9-tetramethyl-1,3,8-triazaspiro[4.5]decane-2,4-dione and 0.7 g of cis-4-cyclohexene-1,2-dicarboxylic anhydride was heated at 150°–160° C. for 1 hour, under a nitrogen stream. After completion of the reaction, the reaction mixture was treated in the similar manner as in Example 10, giving the desired compound (31) as pale yellow powder softening at 99°–104° C. and having a mean molecular weight of 3,480.

EXAMPLE 32

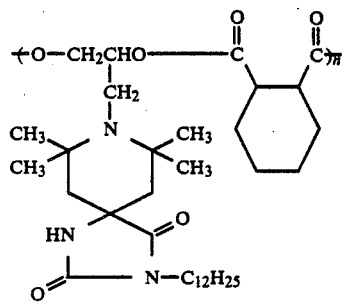

A mixture of 3.0 g of 8-(2,3-epoxypropyl)-3-dodecyl-7,7,9,9-tetramethyl-1,3,8-triazaspiro[4.5]-decane-2,4-dione and 1.0 g of 1,2-cyclohexanedicarboxylic anhydride was heated at 200° C. for 3 hours, under a nitrogen stream. After completion of the reaction, the reaction mixture was treated in the similar manner as in Example 6, giving the desired compound (32) as white powder softening at 103°–108° C. and having a mean molecular weight of 3,680.

EXAMPLE 33

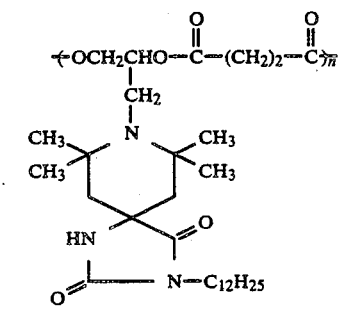

A mixture of 2.0 g of 8-(2,3-epoxypropyl)-3-dodecyl-7,7,9,9-tetramethyl-1,3,8-triazaspiro[4.5]-decane-2,4-dione and 0.44 g of succinic anhydride was heated at 150°–160° C. for 1 hour, under a nitrogen stream. After completion of the reaction, the reaction mixture was treated in the similar manner as in Example 10, giving the desired compound (33) as white powder softening at 80°–85° C. and having a mean molecular weight of 3,000.

EXAMPLE 34

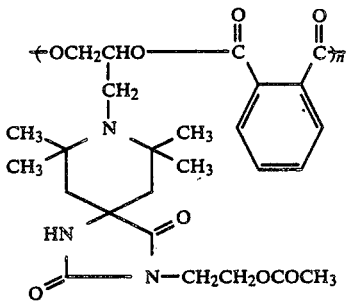

A mixture of 2.0 g of 8-(2,3-epoxypropyl)-3-acetoxyethyl-7,7,9,9-tetramethyl-1,3,8-triazaspiro[4.5]-decane-2,4-dione and 0.8 g of phthalic anhydride was heated at 170°–180° C. for 30 minutes, under a nitrogen stream. After completion of the reaction, the reaction mixture was treated in the similar manner as in Example 6, giving the desired compound (34) as greyish white powder softening at 126°–132° C. and having a mean molecular weight of 1,770.

EXAMPLE 35

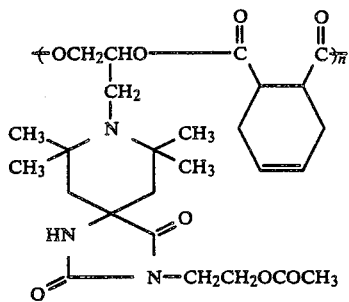

A mixture of 2.0 g of 8-(2,3-epoxypropyl)-3-acetoxyethyl-7,7,9,9-tetramethyl-1,3,8-triazaspiro[4.5]-decane-2,4-dione and 0.83 g of cis-4-cyclohexene-1,2-dicarboxylic anhydride was heated at 150°–160° C. for 1 hour, under a nitrogen stream. After completion of the reaction, the reaction mixture was treated in the similar manner as in Example 6, giving the desired compound (35) as white powder softening at 115°–120° C. and having a mean molecular weight of 1,300.

EXAMPLE 36

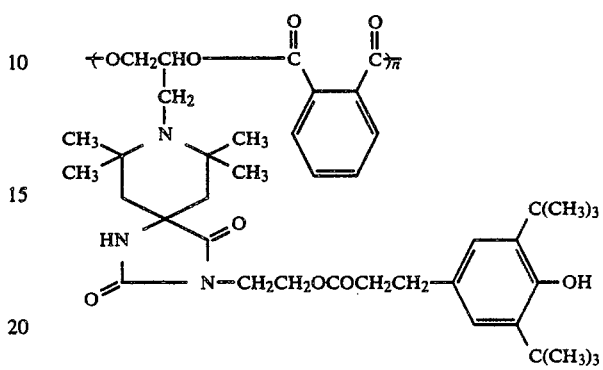

A mixture of 2.0 g of 8-(2,3-epoxypropyl)-3-{2-[3-(3,5-di-tert-butyl-4-hydroxyphenyl)propionyloxy]-ethyl}-7,7,9,9-tetramethyl-1,3,8-triazaspiro[4.5]decane-2,4-dione and 0.5 g of phthalic anhydride was heated at 150°–160° C. for 1 hour, under a nitrogen stream. After completion of the reaction, the reaction mixture was treated in the similar manner as in Example 6, giving the desired compound (36) as white powder softening at 124°–128° C. and having a mean molecular weight of 1,790.

EXAMPLE 37

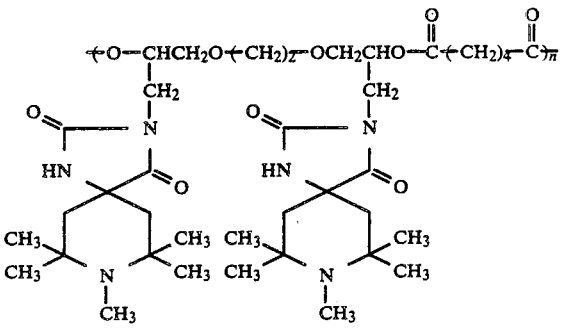

A mixture of 2.0 g of ethyleneglycol bis[2-hydroxy-3-(7,7,8,9,9-pentamethyl-2,4-dioxo-1,3,8-triazaspiro[4.5]-dec-3-yl)propyl]ether and 1.3 g of S,S-bis(2-benzothiazolyl)dithioadipate was refluxed in 25 ml of anhydrous xylene for 10 hours, under a nitrogen stream. After completion of the reaction, the reaction mixture was condensed under a reduced pressure and the resulting residue was dissolved in chloroform. The solution was washed successively with 5% aqueous potassium cabonate solution and water and dried over magnesium sulfate. The residue obtained by removing the solvent from the chloroform solution was treated in the similar manner as in Example 15, giving the desired compound (37) as milky white powder softening at 98°–105° C. and having a mean molecular weight of 1,600.

The starting compound, S,S-bis(2-benzothiazolyl)dithioadipate having the formula

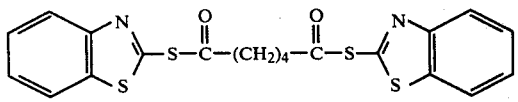

was prepared by the following method.

S,S-bis(2-benzothiazolyl)dithioadipate

To a mixture of 30 g of 2-mercaptobenzothiazole, 16.5 g of triethylamine and 300 ml of tetrahydrofuran was added dropwise adipoyl chloride, under ice-cooling. After completion of addition, the reaction mixture was stirred for 1 hour at an ambient temperature and poured into water.

Crystals precipitated were recrystallized from benzene, giving the desired compound melting at 129°–131° C.

EXAMPLE 38

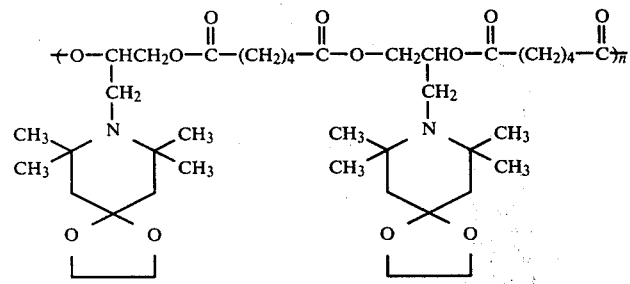

A mixture of 2.0 g of bis[2-hydroxy-3-(7,7,9,9-tetramethyl-1,4-dioxa-8-azaspiro[4.5]dec-8-yl)propyl]adipate and 1.3 g of S,S-bis(2-benzothiazolyl)dithioadipate in 25 ml of anhydrous xylene was refluxed for 10 hours, under a nitrogen stream. After completion of the reaction, the reaction mixture was washed successively with 5% aqueous potassium carbonate and water and dried over magnesium sulfate. The residue obtained by removing the solvent from the reaction mixture was subjected to column chromatography on silica gel and eluted first with benzene:ethyl acetate=1:1, then with ethyl acetate. The eluate eluted with the latter solvent was evaporated, giving the desired compound (38) as pale red, viscous oil having a mean molecular weight of 1,750. Referential Example 1.

Ethyleneglycol bis[2-hydroxy-3-(7,7,8,9,9-pentamethyl-2,4-dioxo-1,3,8-triazaspiro[4.5]dec-3-yl)propyl]ether

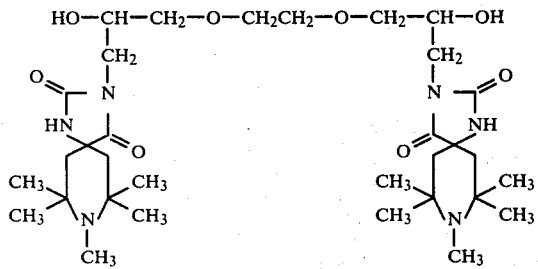

To 60 ml of methanol were added 10.0 g of 7,7,8,9,9-pentamethyl-1,3,8-triazaspiro[4.5]decane-2,4-dione, 0.1 g of potassium hydroxide and 3.0 g of ethyleneglycol bis(2,3-epoxypropyl)ether and the mixture was refluxed for 8 hours, under stirring. After completion of the reaction, the reaction mixture was cooled and crystals precipitated were washed with methanol and recrystallized from benzene, giving the desired compound as white crystals melting at 213°–215° C. Referential Example 2.

Bis[2-hydroxy-3-(7,7,9,9-tetramethyl-1,4-dioxa-8-azaspiro[4.5]dec-8-yl)propyl]adipate

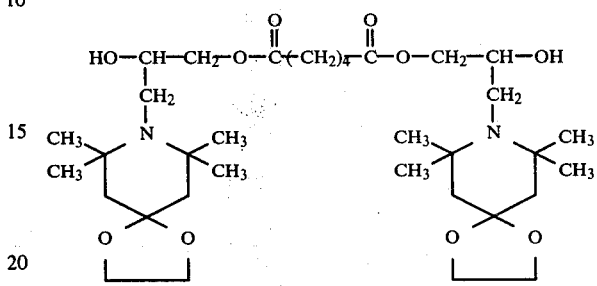

To 60 ml of xylene were added 10.0 g of 8-(2,3-epoxypropyl)-7,7,9,9-tetramethyl-1,4-dioxa-8-azaspiro[4.5]decane and 2.4 g of adipic acid and the mixture was refluxed for 16 hours, under stirring. After completion of the reaction, the residue obtained by removing xylene from the reaction mixture under a reduced pressure was purified by column chromatography on silica gel (eluent: benzene:ethyl acetate=1:1), giving the desired compound as pale yellow, viscous product. The compound showed $R_f$ value of 0.53 on a thin-layer chromatography on silica gel when developed with ethyl acetate.

EXAMPLE 39

Mixtures were made from 100 parts of polypropylene powder (MFI~18), 0.2 part of stearyl 3-(3,5-di-tert-butyl-4-hydroxyphenyl)propionate as an antioxidizing agent, and 0.25 part of stabilizer compounds of the invention listed in Table 1. The resulting mixtures were blended and homogenized with a Brabender Plastograph at 200° C. for 10 minutes and then pressed with a laboratory press to sheets of 2–3 mm thick. The sheets were heated at 260° C. and pressed with a hydraulic press (12 ions) and put immediately into cold water to form films of 0.5 mm thick, from which films of 0.1 mm thick were obtained by the same procedures. The films were cut into test specimens of 50×120 mm. The test specimens were exposed to light in a Sunshine Weather Meter at a black panel temperature of 63±° C. and examined periodically to determine the percentage of elongation at break. The test results were expressed as a ratio of the time required for the test specimens to reach 50% elongation at break when a stabilizer was used to the time required for the test specimens to reach 50% elongation at break when no stabilizer was used.

The results are shown in Table 1.

TABLE 1

| Polymer No. | Ratio | Polymer No. | Ratio |
|---|---|---|---|
| 1 | 4.6 | 19 | 5.8 |
| 2 | 5.1 | 20 | 5.4 |
| 3 | 4.8 | 21 | 5.6 |
| 4 | 3.9 | 22 | 4.8 |
| 5 | 4.5 | 23 | 4.3 |
| 6 | 4.7 | 24 | 5.0 |
| 7 | 4.2 | 25 | 5.3 |
| 8 | 4.8 | 26 | 5.4 |
| 9 | 3.8 | 27 | 5.0 |
| 10 | 4.6 | 28 | 5.5 |
| 11-A | 4.0 | 29 | 5.5 |
| 11-B | 4.2 | 30 | 5.7 |
| 12 | 3.9 | 31 | 5.3 |
| 13-A | 4.4 | 32 | 5.5 |
| 13-B | 4.9 | 33 | 5.2 |
| 13-C | 4.8 | 34 | 4.6 |
| 14 | 4.2 | 35 | 4.4 |
| 15 | 3.8 | 36 | 4.9 |
| 16 | 4.5 | 37 | 4.8 |
| 17 | 4.8 | 38 | 4.5 |
| 18 | 5.2 | | |

EXAMPLE 40

10 g of polyurethane ("Paraprene 22S", tradename, sold by Nippon Polyurethane Kogyo) and 50 mg of each in turn of the stabilizing compounds of the invention were dissolved in 30 ml of dimethylformamide. The solution was poured onto a glass plate to give a film of thickness about 0.4 mm. The film was dried at 60° C. for 20 minutes and at 120° C. for 15 minutes, giving a film about 0.1 mm thick.

The film was then subjected to ultraviolet radiation in a Sunshine Carbon Arc Weather Meter (type WEL-SUH-HC, sold by Suga Test Instruments Co., Ltd.) for 300 hours and the change in yellowness index was measured.

The results are shown in Table 2.

TABLE 2

| Polymer No. | Yellowness Index before radiation | Yellowness Index after radiation |
|---|---|---|
| 3 | 1.5 | 25.2 |
| 8 | 1.9 | 27.4 |
| 10 | 1.7 | 24.5 |
| 17 | 2.0 | 28.5 |
| 19 | 1.6 | 24.7 |
| 20 | 1.8 | 23.7 |
| 22 | 1.6 | 24.4 |
| None | 1.5 | 49.1 |

EXAMPLE 41

Mixtures were made from 100 parts of polystyrene ("Styron 666", trade name, sold by Asahi Dow, Co., Ltd.) and 0.25% of each in turn of the stabilizing compounds of the invention. The resulting mixtures were then blended and homogenized using a Brabender Plastograph at 200° C. for 5 minutes and compression-moulded at 180° C. for 2 minutes to form sheets of thickness about 1.5 mm. The sheets were exposed in Xenon Weater-Ometer type 65WR in accordance with ASTM G26 for 1500 hours and the change in yellowness index was determined according to ASTM D1925.

The results are shown in Table 3.

TABLE 3

| Polymer No. | Yellowness Index before exposure | Yellowness Index after exposure |
|---|---|---|
| 2 | 2.1 | 11.5 |
| 9 | 1.8 | 10.9 |
| 16 | 1.9 | 10.7 |
| 33 | 2.0 | 11.2 |
| None | 1.8 | 37.7 |

What is claimed is:

1. A synthetic polymeric material composition containing from 0.01 to 5 percent by weight of a stabilizer to stabilize it against photo- and thermal-deterioration, the stabilizer comprising a polymer having the formula

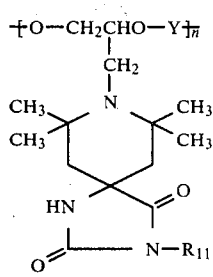

wherein
Y represents a saturated aliphatic diacyl group having from 4 to 12 carbon atoms, a benzenedicarbonyl group, a cyclohexanedicarbonyl group, a 4-cyclohexene-1,2-dicarbonyl group, a 3-(or 4-)methyl-4-cyclohexene-1,2-dicarbonyl group or a 5-norbornene-2,3-dicarbonyl group, $R_{11}$ represents an alkyl group having from 1 to 12 carbon atoms, a group of formula $-CH_2CH_2OR_{18}$ (in which $R_{18}$ represents an alkanoyl group having from 2 to 12 carbon atoms, a benzoyl group or a 3-(3,5-di-tert-butyl-4-hydroxyphenyl)propionyl group), and n is an integer of from 2 to 50.

2. The synthetic polymeric material composition of claim 1 wherein Y is a succinyl group, a phthaloyl group, a cyclohexane-1,2-dicarbonyl group or a 4-cyclohexene-1,2-dicarbonyl group.

3. The synthetic polymeric material composition of claim 1 wherein $R_{11}$ is an alkyl group having from 4 to 12 carbon atoms.

4. The synthetic polymeric material composition of claim 3 wherein $R_{11}$ is an alkyl group having from 4 to 12 carbon atoms.

5. The synthetic polymeric material composition of claim 1 wherein n is an integer of from 2 to 6.

6. The synthetic polymeric material composition of claim 1 wherein Y is a succinyl group, a phthaloyl group, a cyclohexane-1,2-dicarbonyl group or a 4-cyclohexene-1,2-dicarbonyl group, $R_{11}$ is an alkyl group having from 4 to 12 carbon atoms, and n is an integer of from 2 to 6.

7. The synthetic polymeric material composition of claim 6 wherein Y is a succinyl group or a phthaloyl group.

* * * * *